(12) United States Patent
Piramuthu et al.

(10) Patent No.: US 11,250,487 B2
(45) Date of Patent: Feb. 15, 2022

(54) COMPUTER VISION AND IMAGE CHARACTERISTIC SEARCH

(71) Applicant: eBay Inc., San Jose, CA (US)

(72) Inventors: Robinson Piramuthu, Oakland, CA (US); Timothy Samuel Keefer, San Jose, CA (US); Kenneth Clark Crookston, Freiberg (DE); Ashmeet Singh Rekhi, Campbell, CA (US); Niaz Ahamed Khaja Nazimudeen, Fremont, CA (US); Padmapriya Gudipati, San Jose, CA (US); Shane Lin, Mountain View, CA (US); John F. Weigel, San Jose, CA (US); Fujun Zhong, Saratoga, CA (US); Suchitra Ramesh, San Jose, CA (US); Mohammadhadi Kiapour, San Francisco, CA (US); Shuai Zheng, Berkeley, CA (US); Alberto Ordonez Pereira, Santa Clara, CA (US); Ravindra Surya Lanka, San Jose, CA (US); Md Atiq Ul Islam, San Jose, CA (US); Nicholas Anthony Whyte, San Jose, CA (US); Giridharan Iyengar, San Jose, CA (US); Bryan Allen Plummer, Urbana, IL (US)

(73) Assignee: eBay Inc., San Jose, CA (US)

( * ) Notice: Subject to any disclaimer, the term of this patent is extended or adjusted under 35 U.S.C. 154(b) by 43 days.

(21) Appl. No.: 16/388,473

(22) Filed: Apr. 18, 2019

(65) Prior Publication Data

US 2019/0244271 A1 Aug. 8, 2019

Related U.S. Application Data

(62) Division of application No. 16/235,140, filed on Dec. 28, 2018.

(Continued)

(51) Int. Cl.
*G06Q 30/00* (2012.01)
*G06Q 30/06* (2012.01)
(Continued)

(52) U.S. Cl.
CPC ......... *G06Q 30/0627* (2013.01); *G06F 3/017* (2013.01); *G06F 16/532* (2019.01);
(Continued)

(58) Field of Classification Search
CPC . G06Q 30/0601–0645; G06K 9/00671; G06K 9/6202
(Continued)

(56) References Cited

U.S. PATENT DOCUMENTS 7,089,226 B1    8/2006   Dumais et al.
7,801,885 B1    9/2010   Verma
(Continued)

FOREIGN PATENT DOCUMENTS

AU      2014274171 A1    1/2016
EP       3155577 A1    4/2017
(Continued)

OTHER PUBLICATIONS

Miller A.M. (1988) Valuing Watches, Coin Jewelry, Carvings, and Other Articles. In: Gems and Jewelry Appraising. Springer, Boston, MA. https://doi.org/10.1007/978-1-4684-1404-2_6 (Year: 1988).*
(Continued)

*Primary Examiner* — Resha Desai
*Assistant Examiner* — Kennedy Gibson-Wynn
(74) *Attorney, Agent, or Firm* — FIG. 1 Patents

(57) ABSTRACT

Computer vision and image characteristic search is described. The described system leverages visual search techniques by determining visual characteristics of objects depicted in images and comparing the determined characteristics to visual characteristics of other images, e.g., to
(Continued)

identify similar visual characteristics in the other images. In some aspects, the described system performs searches that leverage a digital image as part of a search query to locate digital content of interest. In some aspects, the described system surfaces multiple user interface instrumentalities that include images of patterns, textures, or materials and that are selectable to initiate a visual search of digital content having a similar pattern, texture, or material. The described aspects also include pattern-based authentication in which the system determines authenticity of an item in an image based on a similarity of its visual characteristics to visual characteristics of known authentic items.

20 Claims, 14 Drawing Sheets

Related U.S. Application Data

(60) Provisional application No. 62/612,275, filed on Dec. 29, 2017.

(51) Int. Cl.
  *G06F 16/538* (2019.01)
  *G06F 16/9535* (2019.01)
  *G06F 16/532* (2019.01)
  *G06K 9/66* (2006.01)
  *G06F 16/583* (2019.01)
  *G06N 20/00* (2019.01)
  *G06F 3/01* (2006.01)
  *G06K 9/00* (2022.01)
  *G06K 9/62* (2022.01)
  *G06F 3/0482* (2013.01)
  *G06F 3/0484* (2022.01)
  *G06F 3/0488* (2022.01)

(52) U.S. Cl.
  CPC .......... *G06F 16/538* (2019.01); *G06F 16/583* (2019.01); *G06F 16/9535* (2019.01); *G06K 9/00671* (2013.01); *G06K 9/6202* (2013.01); *G06K 9/66* (2013.01); *G06N 20/00* (2019.01); *G06Q 30/0643* (2013.01); *G06F 3/0482* (2013.01); *G06F 3/0488* (2013.01); *G06F 3/04842* (2013.01); *G06Q 30/0621* (2013.01); *G06Q 30/0631* (2013.01)

(58) Field of Classification Search
  USPC ............................................... 705/26.1–27.2
  See application file for complete search history.

(56) References Cited

U.S. PATENT DOCUMENTS

| | | |
|---|---|---|
| 7,835,953 B2 | 11/2010 | Chen et al. |
| 7,907,755 B1 | 3/2011 | Perlmutter et al. |
| 8,374,920 B2 | 2/2013 | Hedges et al. |
| 8,386,486 B2 | 2/2013 | Zhang et al. |
| 8,478,744 B1 | 7/2013 | Rose |
| 8,589,410 B2 | 11/2013 | Sud et al. |
| 8,630,851 B1 | 1/2014 | Hertschuh et al. |
| 8,832,096 B1 | 9/2014 | Jing et al. |
| 8,908,962 B2 | 12/2014 | Bhardwaj et al. |
| 9,015,139 B2 | 4/2015 | Wong |
| 9,158,389 B1 | 10/2015 | Sharma et al. |
| 9,171,092 B2 | 10/2015 | Kruglick |
| 9,176,993 B2 | 11/2015 | Grauman et al. |
| 9,269,011 B1 | 2/2016 | Sikka et al. |
| 9,317,753 B2 | 4/2016 | Saptharishi et al. |
| 9,420,319 B1 | 8/2016 | Story et al. |
| 9,639,957 B2 | 5/2017 | Yalniz et al. |
| 9,672,436 B1 | 6/2017 | Dhua |
| 10,109,051 B1 | 10/2018 | Natesh et al. |
| 10,380,734 B2* | 8/2019 | Parikh ..................... G06T 7/001 |
| 10,963,940 B2 | 3/2021 | Piramuthu et al. |
| 2002/0019819 A1 | 2/2002 | Sekiguchi et al. |
| 2004/0243545 A1 | 12/2004 | Boone et al. |
| 2005/0065773 A1 | 3/2005 | Huang et al. |
| 2005/0086223 A1 | 4/2005 | Rui |
| 2007/0067279 A1 | 3/2007 | Bonabeau et al. |
| 2007/0266002 A1 | 11/2007 | Chowdhury et al. |
| 2008/0152231 A1 | 6/2008 | Gokturk et al. |
| 2008/0154856 A1 | 6/2008 | Riise et al. |
| 2008/0177640 A1 | 7/2008 | Gokturk et al. |
| 2009/0041340 A1 | 2/2009 | Suzuki et al. |
| 2009/0074300 A1 | 3/2009 | Hull et al. |
| 2009/0089246 A1 | 4/2009 | Chi |
| 2009/0132388 A1 | 5/2009 | Omori et al. |
| 2009/0282025 A1 | 11/2009 | Winter et al. |
| 2010/0241528 A1 | 9/2010 | Hedges et al. |
| 2011/0219025 A1 | 9/2011 | Lipson et al. |
| 2012/0062732 A1 | 3/2012 | Marman et al. |
| 2012/0095866 A1* | 4/2012 | Caiazzi .................. G06Q 30/06 705/26.35 |
| 2012/0127316 A1 | 5/2012 | Kundu et al. |
| 2013/0121600 A1 | 5/2013 | Lin et al. |
| 2013/0249934 A1 | 9/2013 | Gershon et al. |
| 2013/0293580 A1 | 11/2013 | Spivack |
| 2014/0040279 A1 | 2/2014 | Beygelzimer et al. |
| 2014/0101134 A1 | 4/2014 | Bohrer et al. |
| 2014/0258267 A1 | 9/2014 | Lin et al. |
| 2014/0324836 A1 | 10/2014 | Chittar et al. |
| 2015/0081656 A1 | 3/2015 | Wang et al. |
| 2015/0248719 A1 | 9/2015 | Hansen |
| 2015/0293942 A1 | 10/2015 | Cady et al. |
| 2016/0109941 A1 | 4/2016 | Govindarajeswaran et al. |
| 2016/0171773 A1 | 6/2016 | Hara |
| 2016/0234568 A1 | 8/2016 | Grusd |
| 2016/0292757 A1* | 10/2016 | Bandara ............. G06Q 30/0278 |
| 2016/0320932 A1 | 11/2016 | Belhumeur et al. |
| 2016/0321733 A1 | 11/2016 | Yonaha et al. |
| 2016/0364414 A1 | 12/2016 | Petrou et al. |
| 2016/0378861 A1 | 12/2016 | Eledath et al. |
| 2017/0097948 A1 | 4/2017 | Kerr et al. |
| 2017/0124434 A1 | 5/2017 | Goodwin et al. |
| 2017/0186032 A1 | 6/2017 | Rangasamy kannadasan et al. |
| 2017/0206465 A1 | 7/2017 | Jin et al. |
| 2017/0243275 A1* | 8/2017 | Goens ................ G06Q 30/0625 |
| 2017/0300905 A1* | 10/2017 | Withrow .............. G06Q 10/087 |
| 2018/0089542 A1 | 3/2018 | Stoop et al. |
| 2018/0260843 A1 | 9/2018 | Hiranandani et al. |
| 2018/0276731 A1 | 9/2018 | Patel et al. |
| 2018/0284955 A1* | 10/2018 | Canavor ............... G06F 3/0482 |
| 2018/0336009 A1 | 11/2018 | Yoganandan et al. |
| 2019/0102752 A1* | 4/2019 | Valenti ............... G06Q 30/0627 |
| 2019/0197599 A1 | 6/2019 | Zia et al. |
| 2019/0205333 A1 | 7/2019 | Piramuthu et al. |
| 2019/0205646 A1 | 7/2019 | Piramuthu et al. |
| 2019/0205962 A1 | 7/2019 | Piramuthu et al. |
| 2019/0206130 A1 | 7/2019 | Ericson et al. |
| 2019/0244436 A1 | 8/2019 | Stansell et al. |
| 2021/0201378 A1 | 7/2021 | Piramuthu et al. |

FOREIGN PATENT DOCUMENTS

| | | |
|---|---|---|
| WO | 2915/191561 A1 | 12/2015 |
| WO | 2019/133849 A1 | 7/2019 |
| WO | 2019/133862 A1 | 7/2019 |
| WO | 2019/133891 A1 | 7/2019 |
| WO | 2019/133849 A8 | 7/2020 |

OTHER PUBLICATIONS

Non-Final Office Action Received for U.S. Appl. No. 16/235,007, dated Feb. 7, 2020, 12 pages.
Response to Final Office Action filed on Jan. 28, 2020 for U.S. Appl. No. 16/235,007, dated Nov. 27, 2019, 13 pages.
Non-Final Office Action Received for U.S. Appl. No. 16/235,140, dated Jan. 24, 2020, 29 pages.

(56) References Cited

OTHER PUBLICATIONS

Applicant Initiated Interview Summary received for U.S. Appl. No. 16/235,290, dated Feb. 4, 2020, 3 pages.
Response to Non-Final Office Action Filed on Feb. 4, 2020, for U.S. Appl. No. 16/235,290 dated Nov. 13, 2019, 13 pages.
"What is Bing Visual Search API", Jul. 12, 2018, 129 pages.
Response to Restriction Requirement filed on May 2, 2019 for U.S. Appl. No. 16/235,007, dated Apr. 17, 2019, 8 pages.
Restriction Requirement received for U.S. Appl. No. 16/235,007 dated Apr. 17, 2019, 7 pages.
Non-Final Office Action received for U.S. Appl. No. 16/235,140, dated May 10, 2019, 21 pages.
Response to Restriction Requirement filed on Apr. 18, 2019 for U.S. Appl. No. 16/235,140, dated Feb. 26, 2019, 7 pages.
Restriction Requirement Received for U.S. Appl. No. 16/235,140, dated Feb. 26, 2019, 5 pages.
Non-Final Office Action received for U.S. Appl. No. 16/235,290, dated Mar. 7, 2019, 21 pages.
Response to Non-Final Office Action filed on Apr. 18, 2019, for U.S. Appl. No. 16/235,290, dated Mar. 7, 2019, 14 pages.
Brunelli, et al., "Image Retrieval by Examples", IEEE Transactions on Multimedia, vol. 2, No. 3, Sep. 10, 2000, pp. 164-171.
Funk, et al., "Searching the Real World using Stationary and Mobile Object Detection", Retrieved from the Internet: URL:http://makufunk.dejdownloadjfunk -antonius final.pdf—[retrieved on Mar. 22, 2019] Dec. 20, 2012, pp. 1-86.
Hsiao—Ti Eh Pu, "An analysis of Web image queries for Search", ASIST 2003. Oct. 22, 2003, pp. 340-347.
Kovashka, et al., "Attribute Pivots for Guiding Relevance Feedback in Image Search", In Proceedings of the IEEE International Conference on Computer Vision (ICCV), Dec. 1, 2013, 8 pages.
International Search Report received for PCT Application No. PCT/US2018/067925, dated Apr. 2, 2019, 5 pages.
International Written Opinion received for PCT Application No. PCT/US2018/067925, dated Apr. 2, 2019, 9 pages.
International Search Report received for PCT Application No. PCT/US2018/067945, dated Apr. 1, 2019, 5 pages.
International Written Opinion received for PCT Application No. PCT/US2018/067945, dated Apr. 1, 2019, 11 pages.
International Search Report received for PCT Application No. PCT/US2018/067982, dated May 13, 2019, 7 pages.
International Written Opinion received for PCT Application No. PCT/US2018/067982, dated May 13, 2019, 7 pages.
Invitation to Pay Additional Fees for PCT Application No. PCT/US2018/067982, dated Mar. 19, 2019, 11 pages.
Tang, et al., "IntentSearch: Capturing User Intention for One-Click Internet Image Search", IEEE Transactions on Pattern Analysis and Machine Intelligence, vol. 34, No. 7, Jul. 2012, pp. 1342-1353.
Non-Final Office Action received for U.S. Appl. No. 16/235,007, dated Jun. 13, 2019, 9 pages.
Final Office Action Received for U.S. Appl. No. 16/235,007, dated Nov. 27, 2019, 12 pages.
Applicant Initiated Interview Summary Received for U.S. Appl. No. 16/235,140, dated Dec. 9, 2019, 3 pages.
Final Office Action Received for U.S. Appl. No. 16/235,140, dated Oct. 18, 2019, 18 Pages.
Response to Final Office Action filed on Dec. 19, 2019 for U.S. Appl. No. 16/235,140, dated Oct. 18, 2019, 12 pages.
Non Final Office action Received for U.S. Appl. No. 16/235,290 dated Nov. 13, 2019, 25 pages.
Anonymous, "Relative Attribute Comparisons for Interactive Image Search From Binary Attribute Labels", Anonymous AAAI submission, Paper ID: 905, Jan. 2018, 8 pages.
Branson et al., "Visual Recognition with Humans in the Loop", ECCV 2010. Lecture Notes in Computer Science, vol. 6314, Sep. 2010, 14 pages.
Kovashka et al., "WhittleSearch: Interactive Image Search with Relative Attribute Feedback", International Journal of Computer Vision, vol. 115, Apr. 4, 2015, pp. 185-210.
Zhao et al., "Memory-Augmented Attribute Manipulation Networks for Interactive Fashion Search", Retrieved from the Internet <http://zpascal.net/cvpr2017/Zhao_Memory-Augmented_Attribute_Manipulation_CVPR_2017_paper.pdf>, 2017, 9 pages.
Response to Non-Final Office Action Filed on Aug. 29, 2019, for U.S. Appl. No. 16/235,007, dated Jun. 13, 2019, 14 pages.
Applicant Initiated Interview Summary Received for U.S. Appl. No. 16/235,140, dated Jun. 24, 2019, 3 pages.
Response to Final Office Action filed on Aug. 5, 2019 for U.S. Appl. No. 16/235,140, dated May 10, 2019, 13 pages.
Final Office Action received for U.S. Appl. No. 16/235,290, dated Jul. 19, 2019, 26 pages.
Response to Final Office Action filed on Sep. 5, 2019 for U.S. Appl. No. 16/235,290, dated Jul. 19, 2019, 13 pages.
Appeal Brief filed on Jul. 6, 2020, for U.S. Appl. No. 16/235,007, dated Jul. 6, 2020, 25 pages.
Decision on Pre-Appeal Brief Request for U.S. Appl. No. 16/235,007, dated May 21, 2020, 2 pages.
Final Office Action Received for U.S. Appl. No. 16/235,290 dated May 13, 2020, 26 Pages.
Applicant Initiated Interview Summary Received for U.S. Appl. No. 16/235,007 dated Apr. 27, 2020, 3 Pages.
Pre-Appeal Brief Filed for U.S. Appl. No. 16/235,007, dated May 6, 2020, 7 pages.
Applicant Initiated Interview Summary Received for U.S. Appl. No. 16/235,140, dated Apr. 15, 2020, 3 Pages.
Response to Non-Final Office Action filed on Apr. 24, 2020 for U.S. Appl. No. 16/235,140, dated Jan. 24, 2020, 16 pages.
Applicant Initiated Interview Summary Received for U.S. Appl. No. 16/235,290, dated Jun. 29, 2020, 3 Pages.
Final Office Action Received for U.S. Appl. No. 16/235,140, dated Jul. 23, 2020, 32 Pages.
Response to Final Office Action filed on Aug. 4, 2020 for U.S. Appl. No. 16/235,290, dated May 13, 2020, 13 pages.
International Preliminary Report on Patentability received for PCT Application No. PCT/US2018/067925, dated Jul. 9, 2020, 11 pages.
International Preliminary Report on Patentability received for PCT Application No. PCT/US2018/067945, dated Jul. 9, 2020, 13 pages.
International Preliminary Report on Patentability received for PCT Application No. PCT/US2018/067982, dated Jul. 9, 2020, 9 Pages.
Notice of Allowance received for U.S. Appl. No. 16/235,007, dated Sep. 16, 2020, 18 pages.
Non Final Office Action Received for U.S. Appl. No. 16/235,140, dated Oct. 16, 2020, 36 Pages.
Response to Final Office Action filed on Sep. 16, 2020 for U.S. Appl. No. 16/235,140, dated Jul. 23, 2020, 16 pages.
Applicant Initiated Interview Summary Received for U.S. Appl. No. 16/235,290, dated Oct. 23, 2020, 3 Pages.
Non Final Office Action Received for U.S. Appl. No. 16/235,290, dated Sep. 18, 2020, 26 Pages.
Response to Non-Final Office Action filed on Oct. 16, 2020 for U.S. Appl. No. 16/235,290, dated Sep. 18, 2020, 11 pages.
Notice of Allowance received for U.S. Appl. No. 16/235,007, dated Nov. 3, 2020, 18 pages.
PTO Response to Rule 312 Communication Received for U.S. Appl. No. 16/235,007, dated Nov. 23, 2020, 2 pages.
Corrected Notice of Allowability received for U.S. Appl. No. 16/235,007, dated Dec. 11, 2020, 13 pages.
Corrected Notice of Allowability received for U.S. Appl. No. 16/235,007, dated Dec. 28, 2020, 13 pages.
Corrected Notice of Allowability Received for U.S. Appl. No. 16/235,007, dated Feb. 26, 2021, 14 pages.
Final Office Action Received for U.S. Appl. No. 16/235,140, dated Apr. 19, 2021, 36 Pages.
Final Office Action received for U.S. Appl. No. 16/235,290, dated Apr. 20, 2021, 27 Pages.
Non-final Office Action received for U.S. Appl. No. 16/235,290, dated Jun. 23, 2021, 7 Pages.
Notice of Allowance Received for U.S. Appl. No. 16/235,290, dated Aug. 6, 2021, 11 pages.

* cited by examiner

US 11,250,487 B2

COMPUTER VISION AND IMAGE CHARACTERISTIC SEARCH

RELATED APPLICATION

This application is a divisional of and claims priority to U.S. patent application Ser. No. 16/235,140, filed Dec. 28, 2018, which claims priority under 35 U.S.C. § 119(e) to U.S. Provisional Patent Application No. 62/612,275, filed Dec. 29, 2017, and titled "Computer Vision." These disclosures are hereby incorporated by reference in their entireties.

BACKGROUND

Conventional text-based search systems depend on a user's ability to express a goal of a search using text. Thus, although these systems may function well in instances in which a goal is readily expressible using text (e.g., find "red running shoes"), these systems may fail in instances in which it is difficult to express this goal using text. This problem is further exacerbated by a requirement in these conventional systems that a common understanding is reached between how items in a search result are identified and techniques used to express the goal, for instance, that both a seller listing an item and prospective buyer searching for the item agree that the item is described with text as "red running shoes." Further still, text descriptions provided by users and describing items depicted in images may not be accurate. Accordingly, conventional systems that rely on these user-provided descriptions to list items may propagate inaccurate descriptions of the items, e.g., by surfacing a listing with an inaccurate description to other users.

SUMMARY

To overcome these problems, computer vision and image characteristic search is leveraged in a digital medium environment. Rather than searching for images by comparing text queries to text data of images, the system described herein leverages visual search techniques where the system determines visual characteristics of objects depicted in images and compares the determined characteristics to visual characteristics of other images, e.g., to identify whether the other images have similar visual characteristics. In some aspects, the described system performs searches that leverage a digital image as part of a search query to locate digital content of interest, e.g., listings of particular goods and services. These digital images may be used to identify characteristics that otherwise may be difficult to describe, such as patterns, a shape of an object (e.g., a collar having a particular shape, a type of heel on a shoe), and so forth. In some aspects, the described system surfaces multiple user interface instrumentalities that include images of patterns, textures, or materials and that are selectable to initiate a visual search of digital content having a similar pattern, texture, or material. The described aspects also include pattern-based authentication in which the system determines authenticity of an item in an image based on a similarity of its visual characteristics to visual characteristics of known authentic items, such as stitching patterns, component movement, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
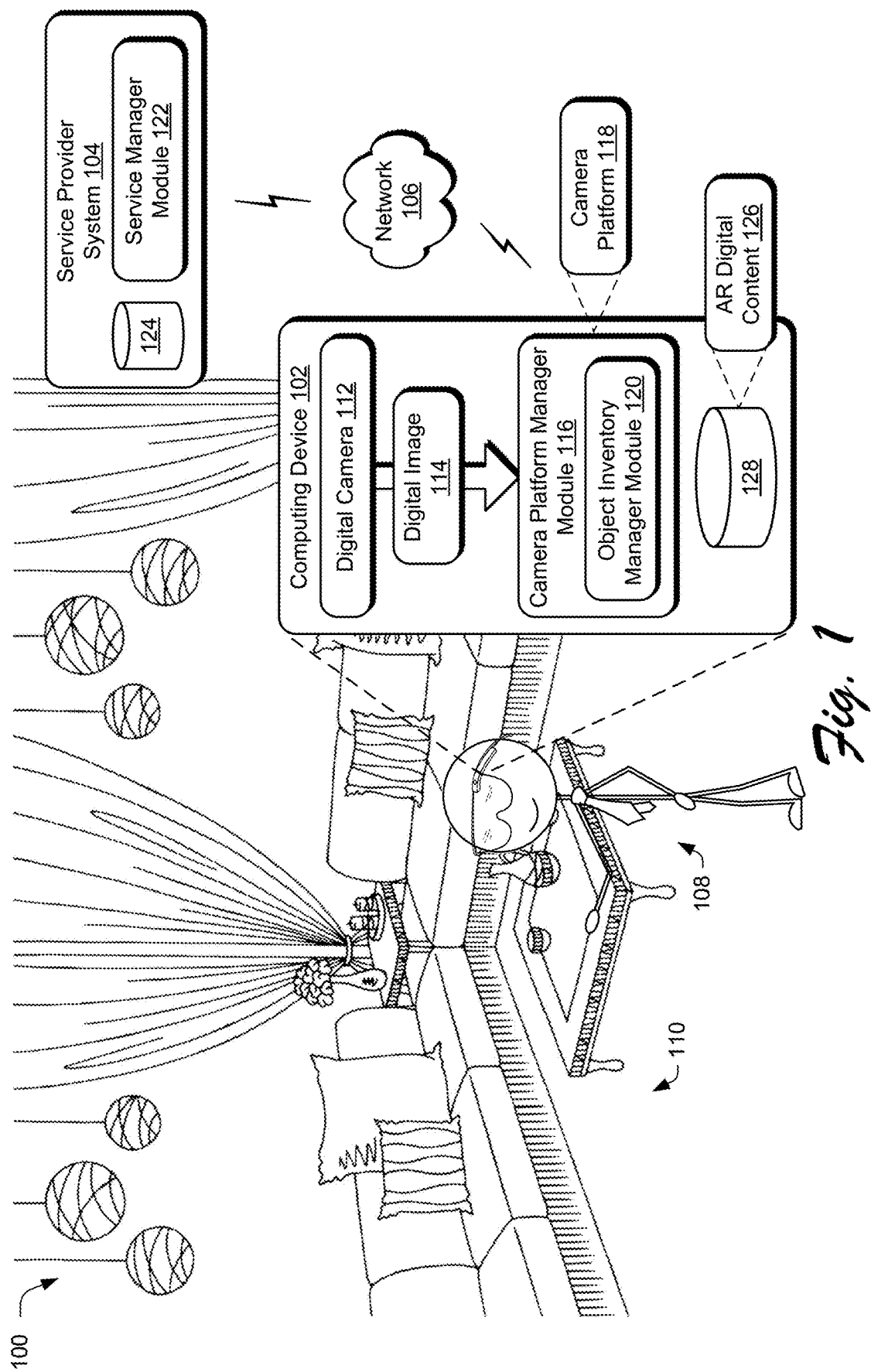
FIG. 1 is an illustration of an environment in an example implementation that is operable to employ techniques described herein.

Conventional text-based search systems depend on a user's ability to express a goal of a search using text. Thus, although these systems may function well in instances in which a goal is readily expressible using text (e.g., find "red running shoes"), these systems may fail in instances in which it is difficult to express this goal using text. This problem is further exacerbated by a requirement in these conventional systems that a common understanding is reached between how items in a search result are identified and techniques used to express the goal.

To overcome these problems, computer vision and image characteristic search is leveraged in a digital medium environment. Rather than leverage image searches that compare text queries to text data (e.g., metadata) of images, the system described herein leverages visual search techniques where the system determines visual characteristics of objects depicted in images and compares the determined characteristics to visual characteristics of other images, e.g., to identify whether the other images have similar visual characteristics.

In some aspects, the described system performs searches that leverage multiple digital images as part of a search query to locate digital content of interest, e.g., listings of particular goods and services. These digital images may be used to identify characteristics that otherwise may be difficult to describe, such as patterns, a shape of an object (e.g., a collar having a particular shape, a type of heel on a shoe), and so forth. In some scenarios, for instance, the described system presents user interfaces that allow users to select multiple, different digital images or portions of images, e.g., from a repository of images and/or a live feed of images. The described system then uses respective visual characteristics of the different digital images or portions to identify the digital content of interest. The described system is also configured to receive user inputs providing a pattern, such as user inputs to draw a pattern (e.g., with a stylus or a touch input device) via a user interface. The described system then uses visual characteristics of the user-provided drawing as a basis for performing an image-based search. Given such user input, the system identifies and presents search results that are based on the user-provided drawing.

The described system is also capable of using a first characteristic depicted in a first selected image (e.g., a shape of an object) and a second characteristic depicted in a second selected image (e.g., a pattern) to locate digital visual content (e.g., a single image) having both the first and second characteristics (e.g., depicting an object having the shape and the pattern). This enables the described system to match search results with search goals that are difficult for users to express using text. Indeed, the described system relieves users of having to convey their search goals using text and also allows them to convey different parts of a search goal with different images.

In some aspects, the described system surfaces multiple user interface instrumentalities that include images of patterns, textures, or materials. Each of these instrumentalities is selectable to initiate a visual search of digital content having a similar pattern, texture, or material. It may be difficult, for instance, for a client device user who is providing input to the system to describe patterns, such as particular plaid patterns having varying numbers and sizes of vertical and horizontal bars. To this end, the system surfaces a user interface to searching users that includes multiple user-interface instrumentalities depicting different patterns. These patterns are selectable, such as with touch input, stylus input, voice input, so forth. Responsive to such a selection, the system initiates a visual search using data (e.g., one or more feature vectors) describing the selected image of the pattern or a portion of it as a search query.

The described aspects also include pattern-based authentication. Here, the described system determines authenticity of an item depicted in an image based on a similarity of its visual characteristics to visual characteristics of known authentic items, such as stitching patterns, component movement, and so forth. In these scenarios, the system obtains visual content (e.g., one or more images or videos) of a product or service that is to be listed as authentic and confirms or denies a designation of authenticity. To confirm or deny an authentic designation, the pattern-based authentication system compares determined visual characteristics of the product or service depicted in obtained visual content to characteristics in visual content of a product or service known to be authentic. To do so, the system may use image or video processing techniques along with visual pattern matching to determine whether a captured pattern matches a known authentic pattern.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles as depicted in the illustrated environment 100) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" for the service provider system 104 as described in FIG. 13.

In the illustrated environment 100, the computing device 102 is depicted as being worn by a user 108 in a physical environment, e.g., a living room 110. In this example, the computing device 102 includes a digital camera 112 that is configured to capture digital images 114 of an outside physical environment (e.g., the living room 110), such as through use of a charge coupled device (CCD) sensor. The captured digital images 114 may then be stored as pixels in a computer-readable storage medium and/or rendered for display by a display device, e.g., LCD, OLED, LED, etc.

The computing device 102 also includes a camera platform manager module 116 that is configured to implement and execute a camera platform 118 (e.g., through use of a processing system and computer-readable storage media) that may serve as a basis for a variety of functionality. The camera platform 118, for instance, may implement a "live view" formed of digital images 114 taken of the physical environment of the computing device 102. These digital images 114 may then serve as a basis to support other functionality.

An example of this functionality is illustrated as an object inventory manager module 120. The object inventory manager module 120 is representative of functionality to manage an inventory of objects. This may include objects that are owned by the user 108 and/or objects that are desired by the user 108, e.g., for purchase. This may be implemented by the object inventory manager module 120 through use of the camera platform 118 in a variety of ways.

In a first such example, the object inventory manager module 120 is configured to collect digital images 114. This may include digital images 114 of physical objects in the living room 110 in this example or digital images captured of physical photos, e.g., from a magazine, a picture taken of a television screen or other display device, and so on. The digital image 114 may also be captured of a user interface output by the computing device 102, e.g., as a screenshot from a frame buffer.

The object inventory manager module 120 includes object recognition functionality to recognize objects included within the digital image 114, e.g., via machine learning. From this, the object inventory manager module 120 may collect data pertaining to these recognized objects. Data describing the recognized objects, for instance, may be communicated via the network 106 to the service provider system 104. The service provider system 104 includes a service manager module 122 that is configured to obtain data related to the objects (e.g., through use of a search) from a storage device 124. The service provider system 104 can then communicate this data back to the computing device 102 via the network 106 for use by the object inventory manager module 120.

The object inventory manager module 120, for instance, may generate augmented reality digital content 126 (illustrated as stored in a storage device 128) for output via a user interface of the computing device 102 as part of a "live feed" of digital images taken of the physical environment, e.g., the living room 110. The AR digital content 126, for instance, may describe characteristics of an object in the living room 110, a brand name of the object, a price for which the object is available for sale or purchase (e.g., via an online auction), and so forth. This AR digital content 126 is then displayed on the user interface for viewing proximal to the object by the object inventory manager module 120. In this way, the camera platform supports functionality for the user 108 to "look around" the living room 110 and view additional object information and insight into characteristics of objects included within the physical environment. Further discussion of this example is described in relation to FIGS. 2-5 in the following discussion.

Figure 2:
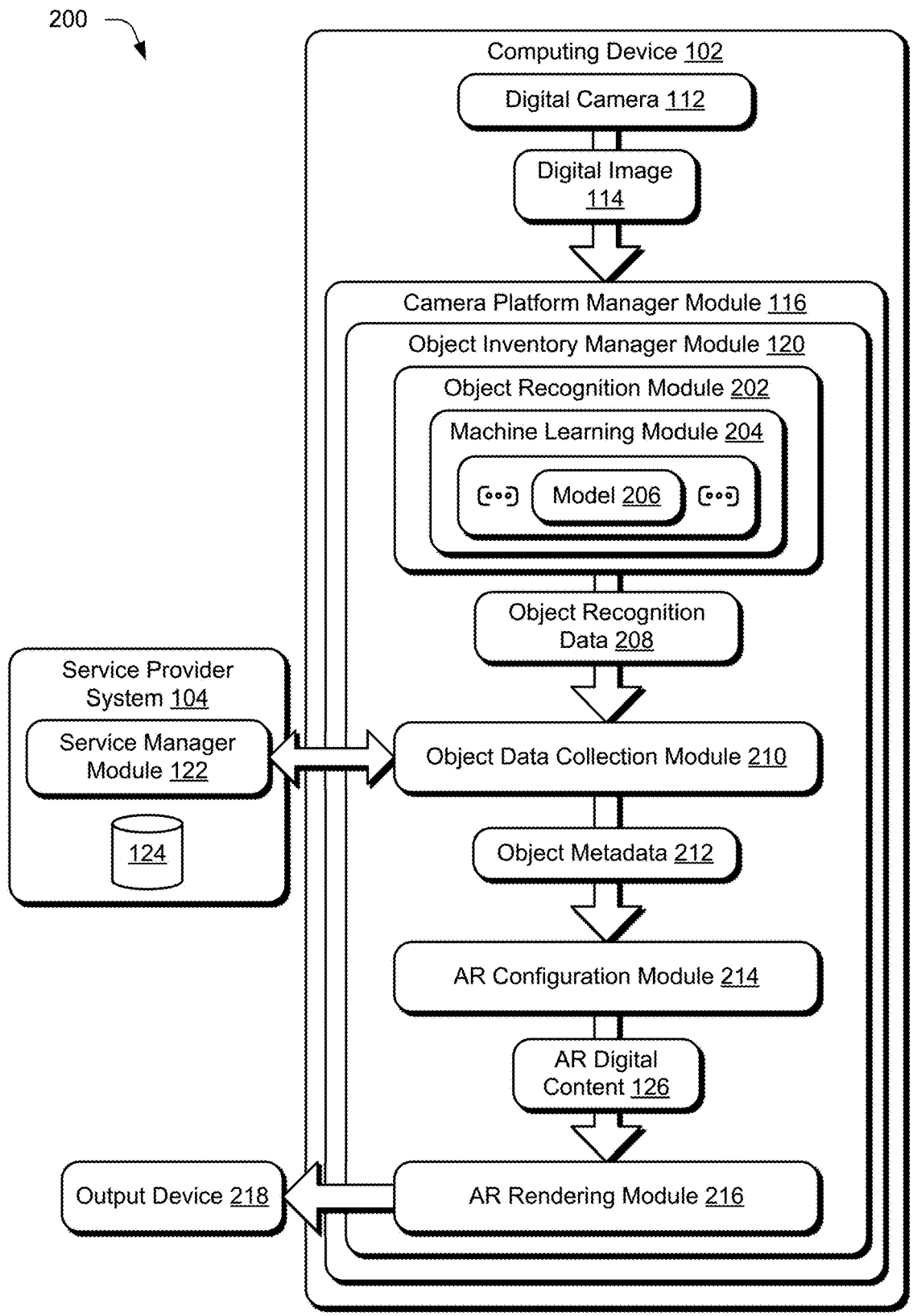
FIG. 2 depicts an example system in which operation of the camera platform manager module of FIG. 1 is depicted in greater detail.

FIG. 2 depicts a system 200 in an example implementation showing operation of the camera platform manager module 116 of FIG. 1 in greater detail. The following discussion describes techniques that may be implemented utilizing the previously described systems and devices. Aspects of the procedure as shown stepwise by the modules of FIG. 2 may be implemented in hardware, firmware, software, or a combination thereof. The procedure is shown as a set of blocks that specify operations performed by one or more devices and are not necessarily limited to the orders shown for performing the operations by the respective blocks.

A digital image 114 is obtained by the camera platform manager module 116. The digital image 114, for instance, may be captured using the digital camera 112, as a screenshot captured from a frame buffer of the computing device 102, and so forth. The digital image 114 is then processed by an object recognition module 202 to recognize an object within the digital image 114. The object recognition module 202, for instance, may employ a machine learning module 204 configured to employ models 206 usable to recognize the object using machine learning, e.g., neural networks, convolutional neural networks, deep learning networks, structured vector machines, decision trees, and so forth. The models 206, for instance, may be trained using training digital images that are tagged with corresponding identifications.

In an implementation, these training digital images and tags are obtained from a commerce service provider system that are tagged by sellers using the system. As a result, a multitude of accurately tagged training digital images may be obtained with minimal computation and user cost as opposed to conventional manual tagging techniques. Although illustrated as implemented locally by the computing device 102, this functionality may also be implemented in whole or in part by the service provider system 104 via the network 106.

Thus, the object recognition data 208 describes an object included in the digital image 114. In accordance with the described techniques, this object recognition data 208 may correspond to text data describing the recognized object. Additionally or alternatively, the object recognition data 208 may correspond to feature data (e.g., a feature vector), which is indicative of visual characteristics of the recognized object. An object data collection module 210 is then employed to collect object metadata 212 that pertains to the recognized object. In scenarios where the object recognition data 208 corresponds to feature data, this object metadata 212 may include a textual description of the recognized object. This metadata collection may be performed locally through a search of a local storage device and/or remotely through interaction with a service manager module 122 of a service provider system 104 via the network 106.

A variety of different types of object metadata 212 may be obtained from a variety of types of service provider systems 104. In one example, the service provider system 104 provides object metadata 212 relating to purchase or sale of the object, e.g., product name, product description, price for purchase or sale (e.g., based on online auctions), and so forth. In another example, the service provider system 104 provides object metadata 212 relating to customer reviews of the product, e.g., a number of "stars" or other rating, textual reviews, and so forth. In a further example, the object metadata 212 describes replacement parts of the object, e.g., filters, batteries, bulbs, and so forth. The object metadata 212 in this instance may be used to then order these replacement parts in an efficient and intuitive manner, e.g., through selection of AR digital content formed from the metadata.

The object metadata 212 in this example is then provided to an augmented reality (AR) configuration module 214. The AR configuration module 214, for instance, may be configured to generate AR digital content 126 from the object metadata 212 for display proximal to the object by an AR rendering module 216 to an output device 218, e.g., display device, audio output device, tactile output device, and so forth. The AR content in this example may include both content supported along with a direct view of a physical environment and content supported along with a recreated view of the physical environment. In this way, through use of the camera platform 118 as implemented by the camera platform manager module 116, a user may simply "look around" using a live feed of digital images 114, select objects in the digital images 114, and obtain metadata related to the objects.

In the replacement part example, the object recognition module 202 may be used to first identify an object. The object recognition data 208 produced based on this recognition may then be used as a "look up" to locate replacement parts associated with the recognized object, e.g., filters, bulbs, batteries, and so forth. AR digital content may then be output that is selectable to purchase these items in a direct view in the user interface. In an example, this information is correlated with a past purchase history, such that the AR digital content may indicate "when" to replace the replacement part, when the replacement part was last purchased, when it is due to be replaced, and so forth.

Having considered an example environment and system, consider now a discussion of some example details of the techniques for computer vision and image characteristic search in in accordance with one or more implementations.

Computer Vision and Image Characteristic Search

In some aspects, computer vision and image characteristic search is leveraged in connection with active image search, which is discussed in relation to FIGS. 3A-5. Aspects of computer vision and image characteristic search also include leveraging listings with patterns, textures, and materials, which is discussed in relation to FIGS. 6-9. In still further aspects of computer vision and image characteristic search, it is used in connection with pattern-based authentication, which is discussed in relation to FIGS. 10-12.

Active Image Search

Figure 3A:
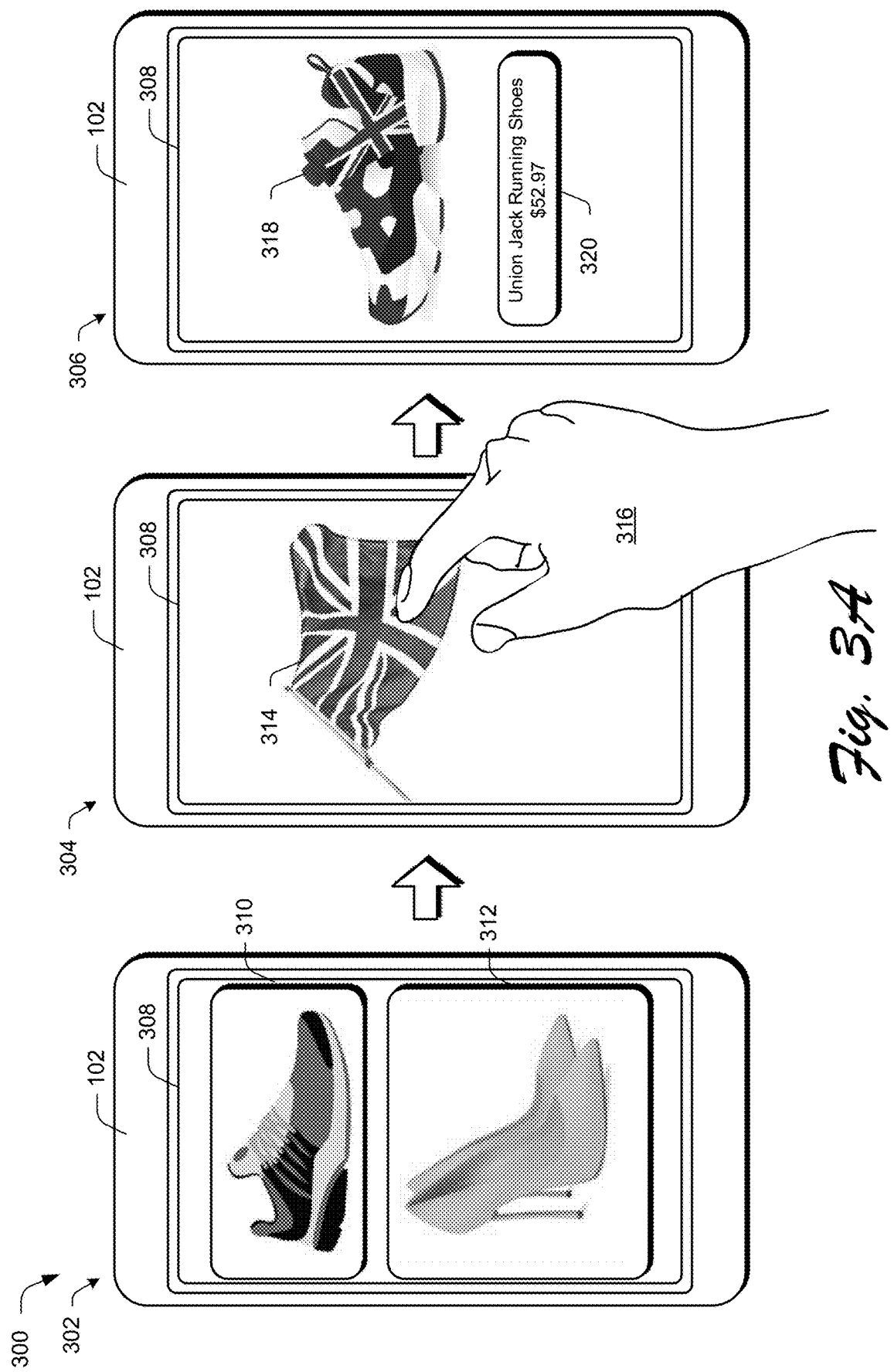
FIGS. 3A-3B depict example implementations of user interaction with a camera platform to define and refine an image search based on inferred image characteristics.
Figure 3B:
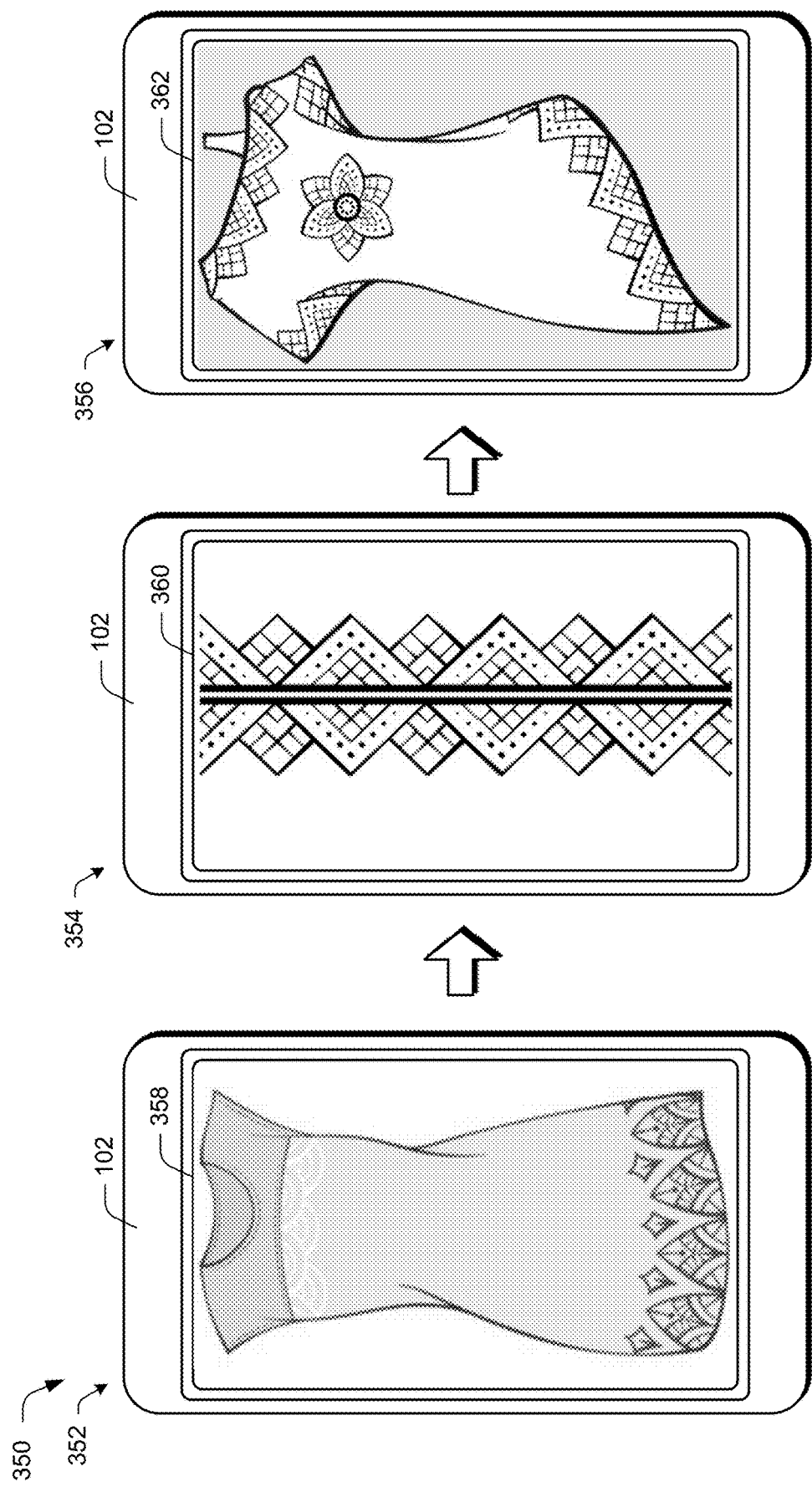
Figure 4:
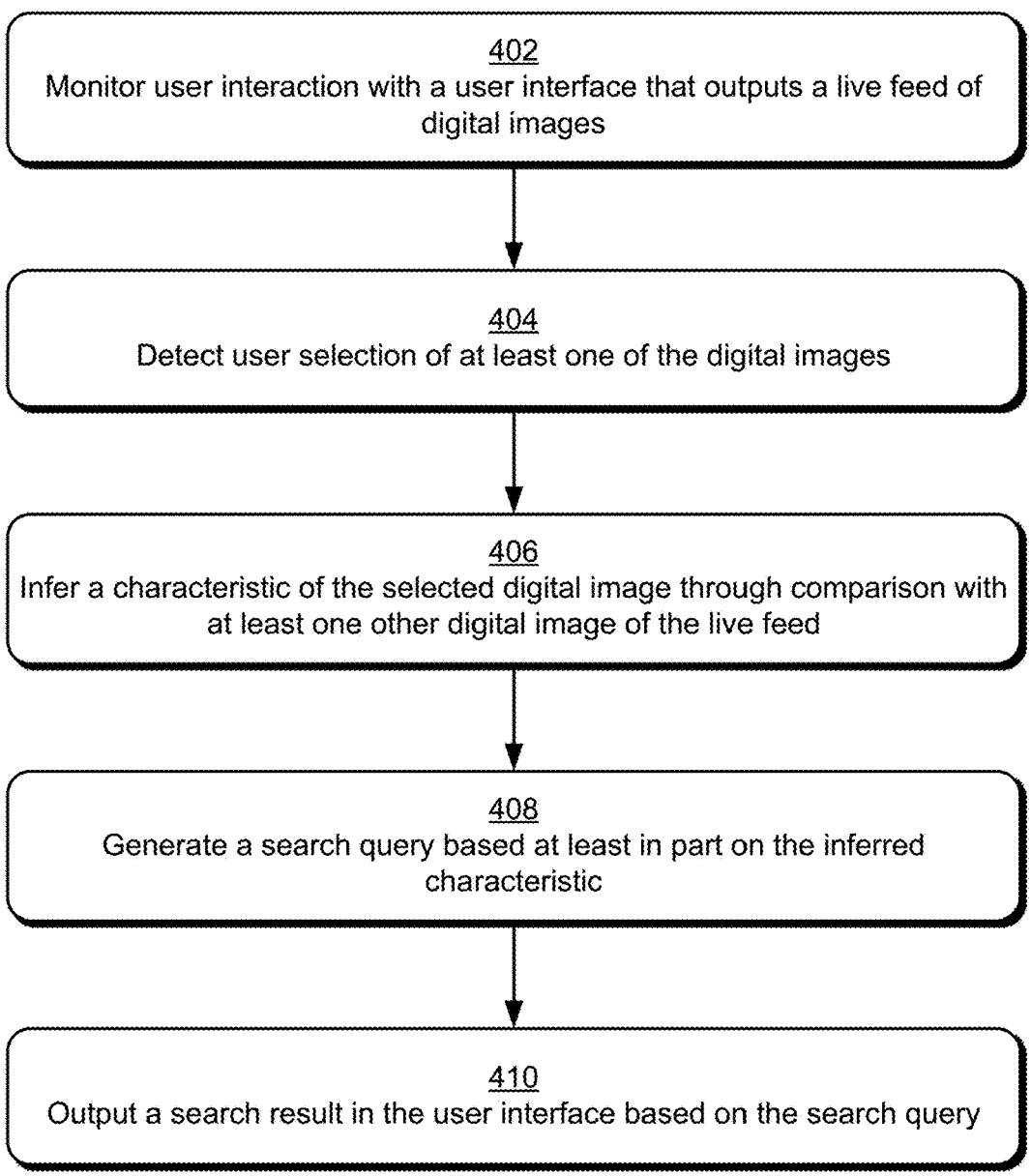
FIG. 4 depicts a procedure in an example implementation in which multiple digital images are used to infer characteristics to be used as a basis to perform a search for digital content.
Figures 5A, 5B:
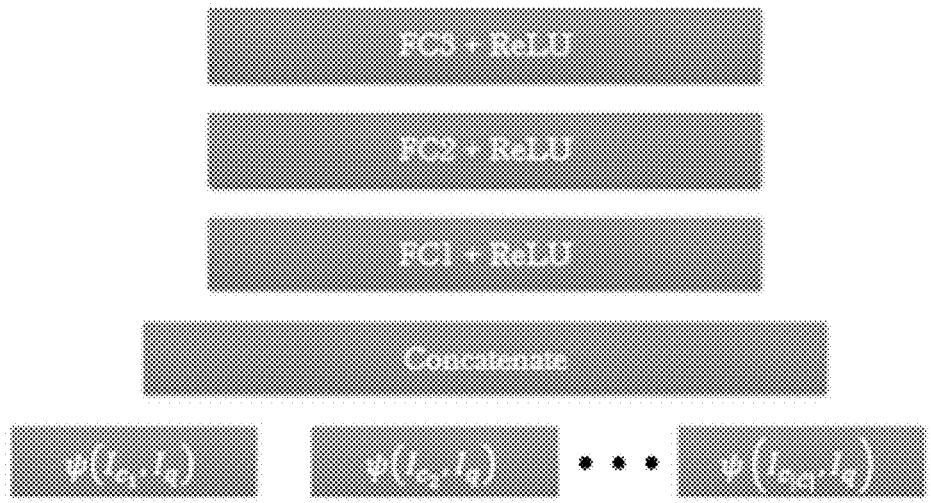
FIGS. 5A-5B depict examples and implementations of image search.

FIG. 3A depicts an example implementation 300 of user interaction with the camera platform 118 as implemented by the camera platform manager module 116 to define and refine an image search based on inferred image characteristics. This implementation 300 is illustrated using first, second, and third stages 302, 304, 306. FIG. 3B depicts another example implementation 350 of user interaction with the camera platform 118 as implemented by the camera platform manager module 116 to define and refine an image search based on inferred image characteristics. This implementation 350 is also illustrated using first, second, and third stages 352, 354, 356. FIG. 4 depicts a procedure 400 in an example implementation in which multiple digital images are used to infer characteristics to be used as a basis to perform a search for digital content. FIGS. 5A-5B depict examples and implementations of image search.

The following discussion describes techniques that may be implemented utilizing the previously described systems and devices. Aspects of the procedure as shown stepwise may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 3A-5.

At the first stage 302 of FIG. 3A, for instance, a user interface 308 is output by the output device 218, e.g., a touchscreen display device of the computing device 102. The user interface 308 includes digital images that are usable as a basis to initiate definition of a search query. For example, a user may utter "find shoes" and the camera platform manager module 116 outputs preconfigured digital images 310, 312 that are usable to further refine the search, such as running shoes or dress shoes. Thus, in this example the preconfigured digital images selected from a repository are used to refine intent of a user that initiates a search.

At the second stage 304, the user interface 308 is configured as a "live feed" of digital images 114 obtained in real time from the digital camera 112 in this example. The live feed includes a digital image 314 of a British flag that is selected by a user. In the illustrated example 300, the user input is detected as a tap of a finger of the user's hand 316 that is detected using touchscreen functionality of the output device 218. In this way, a user may distinguish between multiple objects displayed concurrently in the user interface 308 as well as indicate particular parts of the object of interest, e.g., a pattern in this instance. Other examples are also contemplated, such as a spoken utterance or other gestures.

In response to the user selection of the second stage 304, the digital image 114 displayed in the user interface 308 is captured (e.g., obtained from a frame buffer) along with the indication of the location of the particular object selected, e.g., as guided by X/Y coordinates of the "tap." The digital image 114 is then processed by the object recognition module 202 as described above to identify the object (e.g., the pattern of the British flag in the illustrated example) and generate the object recognition data 208.

The object recognition data 208 is then communicated to a service provider system 104 in this example that is configured to support purchase and sale of goods. Accordingly, the service manager module 122 in this example searches a storage device 124 for object metadata 212 that pertains to the identified object. The object metadata 212, for instance, may include digital content that includes an offer to purchase a good or service having the characteristics inferred from the digital images 310, 314.

As shown at the third stage 306, an example of digital content 318 includes a digital image of a running shoe based on the digital image 310 and having a pattern from digital image 314. The digital content also includes a name and price 320 (e.g., average price, price for sale, price to buy, etc.) of the object, which is displayed proximal to the object, e.g., the Union Jack running shoe. In this way, the camera platform manager module 116 implements the camera platform 118.

User interaction and capture of the digital images may also be used to infer which characteristics of the digital images are to be used as part of a search to infer a user's intent as part of a search. As shown at the first stage 352 of FIG. 3B, for instance, a digital image 358 is captured of a dress having a pattern. In this example, the digital image 358 includes an entire outline of the dress. Thus, the camera platform manager module 116, through machine learning, may detect that the overall shape of the dress is of interest to a user.

At the second stage 354, on the other hand, a digital image 360 is captured as a "close up" of a pattern. From this, the camera platform manager module 116 may determine, using machine learning (e.g., object recognition) that the pattern, texture, and/or materials are of interest in this digital image 360. As a result, the overall shape from digital image 358 and the texture, materials, and/or pattern of the digital image 360 are used to locate digital content 362 (e.g., another digital image in a product listing) of a dress having a similar shape from the digital image 358 and pattern from the digital image 360. In this way, digital images may be used to express user intent that otherwise would be difficult if not impossible using text.

FIG. 4 depicts a procedure 400 in an example implementation of computer vision and active image search. User interaction with a user interface that outputs a live feed of digital images is monitored (block 402). A user, for instance, may view a live feed of digital images taken of a physical environment of the user 108 and the computing device 102. In this way, a user may view objects of interest as well as characteristics of those objects. The camera platform manager module 116 may monitor the user 108's interaction with (e.g., viewing of) the live feed.

User selection is detected of at least one of the digital images (block 404) by the camera platform manager module 116. A user, for instance, may press a button, tap a screen, utter a command, make a gesture, and so on to select one of the digital images from the live feed. The camera platform manager module 116 detects such user selection.

A characteristic is inferred from the selected digital image through comparison with at least one other digital image of the live feed (block 406). As part of the user interaction, for instance, a user may "look around" a physical environment. As part of this, the user may then focus or "zoom in" or "zoom out" on a particular object, such as to view an overall shape of the object, a pattern, texture, or material of the object, and so on. By comparing the selected digital image with a previous or subsequent digital image as part of the live feed, the camera platform manager module 116 may determine what is of interest to the user in the selected digital image. Object recognition using machine learning may be used as part of this comparison by the camera platform manager module 116, such as to compare tags generated using object recognition to determine commonality of the tags (e.g., a pattern in both images) and/or a "new" tag, e.g., an overall shape caused by "zooming out." Additionally or alternately, the camera platform manager module 116 may compare feature data (e.g., feature vectors) generated using the object recognition to determine commonality of the feature data (e.g., a pattern indicated by the feature data in both images) and/or "new" feature data, e.g., describing an overall shape captured by "zooming out."

A search query is then generated based at least in part on the inferred characteristic (block 408). By way of example, the camera platform manager module 116 generates a search query, which may include the selected digital image itself, object recognition data generated from the selected digital image, and so on. A search is then performed, either locally by the computing device 102 or remotely by the service provider system 104. A search result is then output in the user interface based on the search query (block 410) that includes digital content located as part of the search, e.g., product listings, digital images, and so forth.

In active image search applications, users often have a mental picture of desired content to be returned via an image search. The ultimate goals of an image search are to convey the user's mental picture to the system and overcome a difference between the lower-level image representation and higher-level conceptual content. In the techniques described in the following discussion, the system refines image search results by prompting users to indicate which image from a short list of candidate images is more reflective of the desired content.

In connection with active image search, an image search system—included as part of or leveraged by the computing device 102 or the service provider system 104—uses a feedback mechanism to refine search results without using relative attribute annotations that are used by conventional systems. Instead, the image search system learns an image embedding via training on relatively low-cost (e.g., in relation to relative attribute annotations) binary attribute labels already present in many image databases. Given an initial query, the image search system selects images to present to a user. At each iteration, the image search system provides functionality that enables the user to simply select the image which is the most visually similar to their target image.

As noted above, the image search system receives an initial query as input. At each iteration, the image search system searches an image repository using "sampler" strategies to obtain an initial set of candidates. The image search system performs "Candidate Refinement" on this set of images using informative, but computationally expensive selection criteria. During the "user feedback" step, where a user input is received to indicate if the new refined candidates are more representative of the user's desired image or not. If the user selects to accept a new image, for instance, the selected image becomes the query received by the image search system for the next iteration. Unlike conventional techniques which use costly relative attribute annotations to learn an image representation, the techniques described herein leverage low-cost binary labels that already exist in many datasets.

To learn a robust feature representation, the image search system uses a Conditional Similarity Network (CSN). Thus the model 206 corresponds to a CSN in one or more implementations. In accordance with the described techniques, the service provider system 104 may include functionality to use a single network to learn an embedding for multiple attributes jointly by learning a masking function which selects features important to each concept. This provides multiple views of the images in an image repository, which is more computationally efficient than training separate embedding models for each concept. By training in this way, the system also factors the overall similarity between two images when training a representation. The resulting model 206 thus encourages samples to separate into homogeneous subgroups in each embedding space. Therefore, the image search system can traverse an attribute embedding, e.g. heel height, such that a transition from one subgroup to a different sub group (e.g., a boot to a stiletto) in a single step would be unlikely (even if both the boot and stiletto have the same sized heel). By combining constraints with better exploitation of training data, the described image search system improves over conventional systems in measuring the similarity between two images with regards to a specific concept.

Another difference between the techniques leveraged by the described systems and conventional techniques in the continuing example is that models are trained by the described system with binary attribute labels which already exist in many datasets and are relatively cheap to obtain. In one or more aspects, the described image search system refines image search results using a simple feedback mechanism and without using the relative attribute annotations or attribute inputs required by many conventional techniques. In some aspects, the image search system trains a Deep-Q Network-based image selection criteria rather than only using hand-crafted strategies. Additionally, the CSN is configured in a way that encourages smooth transitions between different concepts as the image search system traverses the learned embedding space.

In the following discussion, active image search is first described so as to be incorporated into the live feed techniques discussed above. This discussion includes a description of sampling strategies including how to select informative images using a Deep Q-Network. Modifications are discussed to the CSN which are used during training to learn a set of embeddings used by active image search models, such as the model 206.

For image search with active feedback, the objective is for the image search system to quickly locate a target image $I_t$ in a database given a query q. While the initial query can take multiple forms (e.g. keywords, images, or sketches), it is provided as an image $I_{q0}$ which shares some desirable attribute with the target image. At each iteration, the image search system selects K images to obtain feedback on from a user.

Broadly speaking, active learning criteria focus on reducing uncertainty in a current model or exploiting the information obtained in order to make fine-grained distinctions. In practice, however, many search engines provide means to filter results based on metadata labels. For example, when searching for clothing, a search engine may allow a user to filter results based on its category (e.g. pants), subcategory (e.g. jeans), and color, among others. Coupled with the initial query, such filters provide a strong signal to initialize an active learning algorithm. Thus, the criteria that follow focus on exploitation of this existing knowledge.

As a baseline, the image search system performs an iterative nearest neighbors query to obtain candidate images. At each iteration, the image search system determines the K-nearest neighbors to the current query that have not been previously selected by the user and returns them. Each image selected by the user as the most relevant to their target image is used as the query in the next iteration.

The image search system uses the model 206 to select samples which satisfy a maximum number of feedback constraints provided by the user. For each iteration that a new candidate query $I_{q_i+1}$ is caused by the user—because rather than indicate the search results are satisfactory the user selects one of the provided images to further refine the search—then $I_{q_i}$ is farther away from the target image than $I_{q_i+1}$. In the following discussion, the term F represents a set of such feedback constraints made so far and the term $\mathcal{O}$ represents a set of previously unselected images in a database. Additionally, elements of F are tuples $(I_x, I_y)$ where $I_x$ is closer to the target image than $I_y$. Based on this, the image search system calculates the portion of constraints that a sample satisfies. By way of example, the image search system calculates this portion according to the following equation:

$$S(I_o \mid 1 = 1, F) = \frac{1}{|F|} \sum_{\forall I_{x_n}, I_{y_n} \in F} \mathbb{1}_{fcs}(I_o, I_{x_n}, I_{y_n}),$$

Here, the term $\mathbb{1}_{fcs}$ represents an indicator function that uses a distance function D and returns one if $D(I_o, I_{x_j}) < D(I_o, I_{y_j})$. In accordance with one or more implementations, a scenario where $l=1$ indicates that a sample satisfies the portion of constraints. Given this, criteria for a next proposed query can be represented in one or more examples as:

$$I^*_{q_i+1} = \underset{I_o \in \mathcal{O}}{\operatorname{argmax}} S(I_o \mid 1 = 1, F).$$

The image search system is configured to break ties using nearest neighbors sampling between the candidates and the query image.

While sampling strategies can provide likely candidates based on a current model, these strategies do not take into account an amount a sample informs search results. Many conventional techniques that provide such information are computationally expensive, making it infeasible to run over an entire database. As such, the described image search system identifies a short list of likely candidates C using image sampling criteria, and then re-ranks them based on how informative these candidates are to the current model.

In expected error reduction, this refinement strategy leveraged by the image search system focuses on reducing generalization error of the current model for the desired target image. As such, the search strategy deployed by the image search system balances exploration and exploitation criteria. In one or more implementations, the image search system measures entropy of the current model by calculating the portion of constraints an image satisfies. By way of example, the image search system may calculate the portion of constraints satisfied in accordance with the following:

$$H(F) = -\sum_{I_o \in \mathcal{O}} \sum_l S(I_o \mid l, F) \log(S(I_o \mid l, F)).$$

Here, note that $S(I_o \mid l = 0, F)$ is defined as $1 - S(I_o \mid l = 1, F)$. Further the term $I_{t*}$ represents a current best guess, which is used as a proxy for the target image when predicting the user's response r. The image search system estimates a likelihood that a new constraint is satisfied by determining a likelihood that a candidate image shares the same attributes with the target image. The image search system obtains this likelihood by converting the distances in an attribute's embedding space to a probability. The image search system learns scaling parameters $\phi$ based on a training set. Given this, the image search system selects the candidate images according to the following:

$$I^*_{q_i+1} = \underset{I_c \in C}{\operatorname{argmax}} \sum_r \sigma(r \mid D(I_c, I_{t*}), \phi) H(F \cup (I_c, r)).$$

In systems that use Learned Re-ranking Criteria, a learned criteria adapts to the exact task and dataset. To this end, the service provider system 104 trains a Deep Q-Network (DQN) with experience replay to learn how to select informative images as the candidate images. In this paradigm, the system learns a function Q that estimates the reward ρ by taking some action given the current state of the system Ψ. In accordance with the described techniques, a value ρ is defined as a change in a percentile rank of the target image under the current model after obtaining feedback from the user. Further, the current state of the system Ψ may be determined as a concatenation of the difference of the embedding representation of the query image and all of the candidate images being re-ranked. FIG. 5A depicts an example 500 of an implementation of a structure of a DQN model. In one or more implementations, the model 206 is implemented based on this structure. In any case, in operation, the image search system uses the selection criteria to maximize an expected reward if image $I_c$ is selected to present to the user:

$$I^*_{q_i+1} = \underset{I_c \in C}{\operatorname{argmax}} Q(I_c, \Psi).$$

In accordance with the described techniques, this model is trained using Huber loss on top of a temporal difference error between the expected and observed rewards. With reference to the illustrated example 500, the image search system uses the function $\psi(I_c, I_q)$ to return the difference between each image's feature representation. Further, the output dimension of FC3 is |C|, which represents a predicted reward of selecting its corresponding candidate.

Broadly speaking, the image search system trains a set of embeddings to compare two images, where each embedding represents a different attribute to be captured. In implementations where the model 206 is a CSN model, the CSN model is designed to learn a disentangled embedding for different attributes in a single model. In this way, a general image representation is learned through the image encoding layers of the model. The image search system then applies a trained mask to the representation to isolate the features important to that specific attribute. This enables each embedding to share some common parameters across concepts, while the mask is tasked with transforming the features into a discriminative representation. After obtaining the general embedding features between two images $G_i$, $G_j$, the image search system compares their general embedding features. By way of example, the image search system compares them using a masked distance function, such as:

$$D_m(G_i,G_j;m_a)=||G_i \in m_a - G_j \in m_a||_2,$$

Here, the term $m_a$ is a mask for some attribute and the operator $\in$ denotes an element-wise multiplication. In one or more implementations, the service provider system 104 trains the CSN model using a triplet loss function such as:

$$L_T(G_x,G_y,G_z;m_a)=\max\{0,D_m(G_x,G_y;m_a)-D_m(G_x,G_y;m_a)+h\}.$$

The service provider system 104 also configures the embedded features G to be L2 regularized to encourage regularity in the latent space. In addition, L1 regularization is performed on the masks m to encourage a sparse feature selection. Based on this, the resulting total loss function with which the model is trained is:

$$L_{CSN}(G_x,G_y,G_z;m_a)=L_T(G_x,G_y,G_z;m_a)+\lambda_1||G||_2^2+\lambda_2||m_a||_1$$

Since the goal is to traverse the model's embeddings in order to locate a target image, it is desirable that the embeddings provide natural transitions from image to image. For example, transitioning from an anchor image to the rightmost image in the example 510 of FIG. 5B would be considered a significant divergence. The center image, while still different, is a less divergent transition even though all three images of the example 510 belong to the boot category. Therefore, to make embedding spaces intuitive overall, the described system accounts for similarity between two images beyond an attribute being encoded. Given a set of attributes represented by $A_x$, $A_y$, $A_z$, for each of the images in a training triplet, the difference in shared attributes is computed between the negative and positive pairs. By way of example, the system computes the differences in shared attributes according to the following:

$$w(A_x, A_y, A_z) = \max\left\{0, \frac{1}{\varepsilon}(|A_x \cap A_y| - |A_x \cap A_y|)\right\}$$

Here, the term $\varepsilon$ represents a number of embeddings being trained. The system prevents negative values of w to maintain a minimum margin between negative and positive pairs of the triplet. In one or more implementations the system determines a new margin, which may be defined as follows:

$$h'(A_x,A_y,A_z)=h+\eta w(A_x,A_y,A_z)$$

Here, the term $\eta$ is the scalar parameter. It is to be appreciated that visual searches performed with models trained in manners different from those described just above may be leveraged without departing from the spirit or scope of the described techniques. As noted in the above discussion, however, image searches that are based on visual characteristics can be used in scenarios where it may be difficult for users to accurately convey, in words, a desired target image or item. In this context, consider the following discussion of listings with patterns, textures, and materials.

Listings with Patterns, Textures, and Materials

An increasing number of service provider systems and associated applications surface listings to client devices for various products due to advances in computing technologies. Conventional techniques for generating such listings typically involve associating text (e.g., text tags) with a listing that is descriptive of the product corresponding to the listing. When listing a shirt to be surfaced via a platform (e.g., for sale via an e-commerce platform), for instance, conventional systems may allow a client device user to enter or select textual descriptions of the shirt, such as to describe the shirt's color, pattern, texture, or material. Such conventional systems also employ text-based search techniques to identify items. In other words, these conventional techniques consider the text associated with listed items, and surface items that are associated with text that matches the searched-for text. However, attributes of many items (e.g., patterns, textures, materials, and so on) can be difficult to describe using text. It may be difficult, for instance, for a client device user who is providing input to a system to list an item, or for a client device user who is providing input to the system to search through listed items, to describe patterns, such as particular plaid patterns having varying numbers and sizes of vertical and horizontal bars.

To overcome these problems, the described system leverages computer vision and image characteristic search. In contrast to conventional techniques, this system does not rely on a textual description of an item, e.g., one that is associated with the item by the system or a client device user. Instead, the system leverages one or more images (or videos) of an item being listed, and determines visual characteristics of the item, such as patterns, textures, materials, and so on, automatically from the images and/or videos. As part of this, the system performs one or more image processing techniques on visual digital content (e.g., images or videos) provided to the system in connection with listing an item. Based on this image processing, the system generates visual data that describes the characteristics, e.g., one or more image feature vectors that are capable of describing a pattern, a texture, and/or a material of the item depicted in the image.

Additionally, the system does not rely on text as a basis for searching though listed items. Instead, the system leverages image (or video) queries to perform a visual search of listed items, such as by comparing feature vectors describing a pattern of a query image to the feature vectors describing patterns of listed items. To obtain a query image, the system is configured to surface a user interface, to searching users, that enables a searching user to upload an image (or video) as a search query. The system is also configured to present multiple user-interface instrumentalities depicting different patterns and that are selectable as a search query to initiate a search. Additionally or alternately, the system is configured to present a user interface that allows a user to provide a pattern, such as by providing user inputs to draw a pattern (e.g., with a stylus or touch input device) via the user interface.

The system may use an entirety or a portion of this uploaded, selected, or user-drawn image as the search query image. Regardless of whether the query image is uploaded, selected, or drawn via the interface by a searching user, the system may perform the one or more image processing techniques on the query image. For instance, the system performs a search based on an uploaded image, a user-selected pattern, or a user-provided drawing. In so doing, the system generates non-textual data indicative of the characteristics of the query image, e.g., one or more image feature vectors that are capable of describing the pattern, texture, and/or material depicted in at least a portion of the query image. Given such user input and the data indicative of the characteristics, the system identifies and presents search results, for instance, that are based on the uploaded image, the user-selected pattern, or the user provided drawing.

Figure 6:
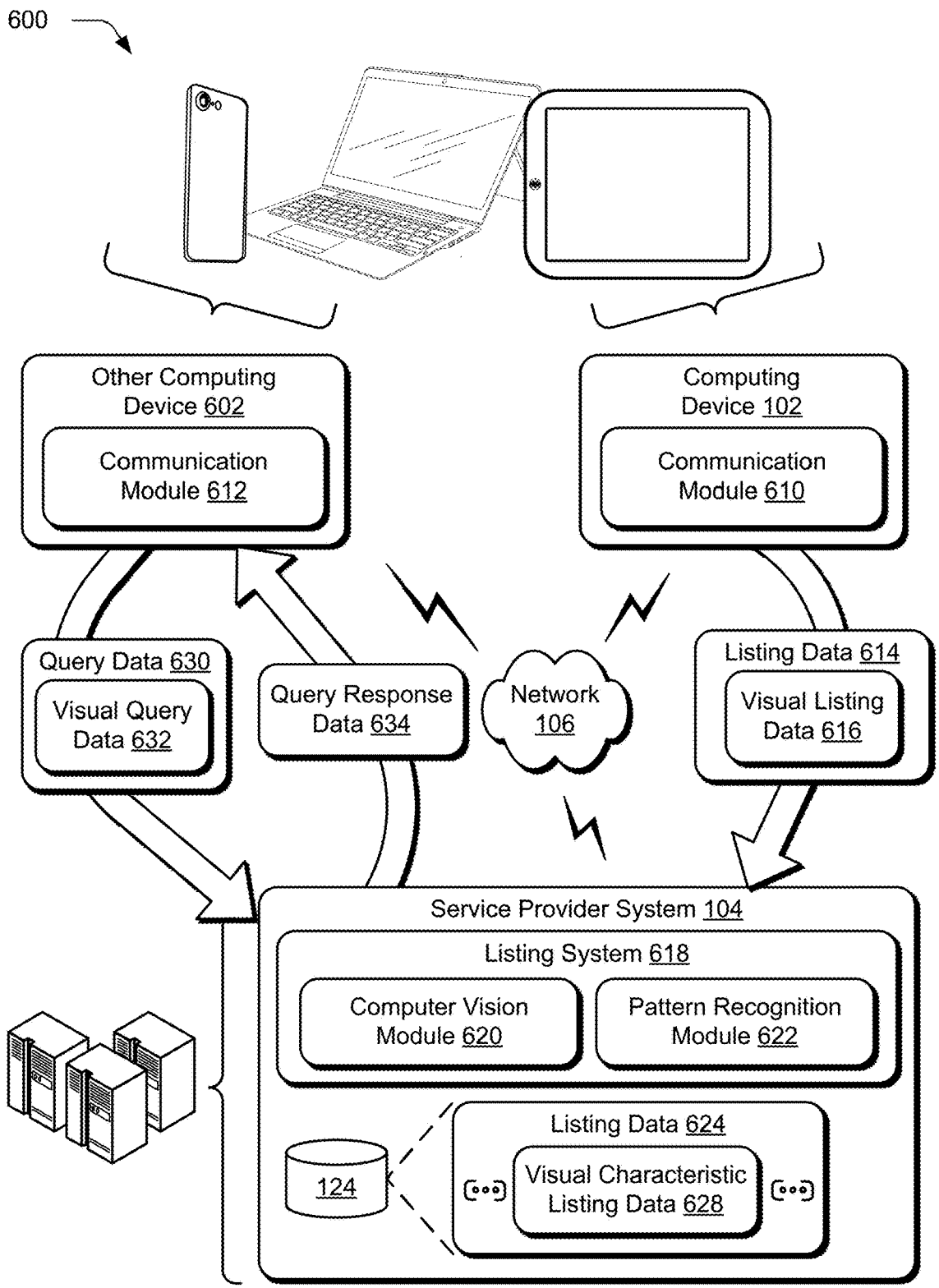
FIG. 6 depicts another example environment that is operable to employ aspects of listings with patterns, textures, and materials as described herein.
Figure 7:
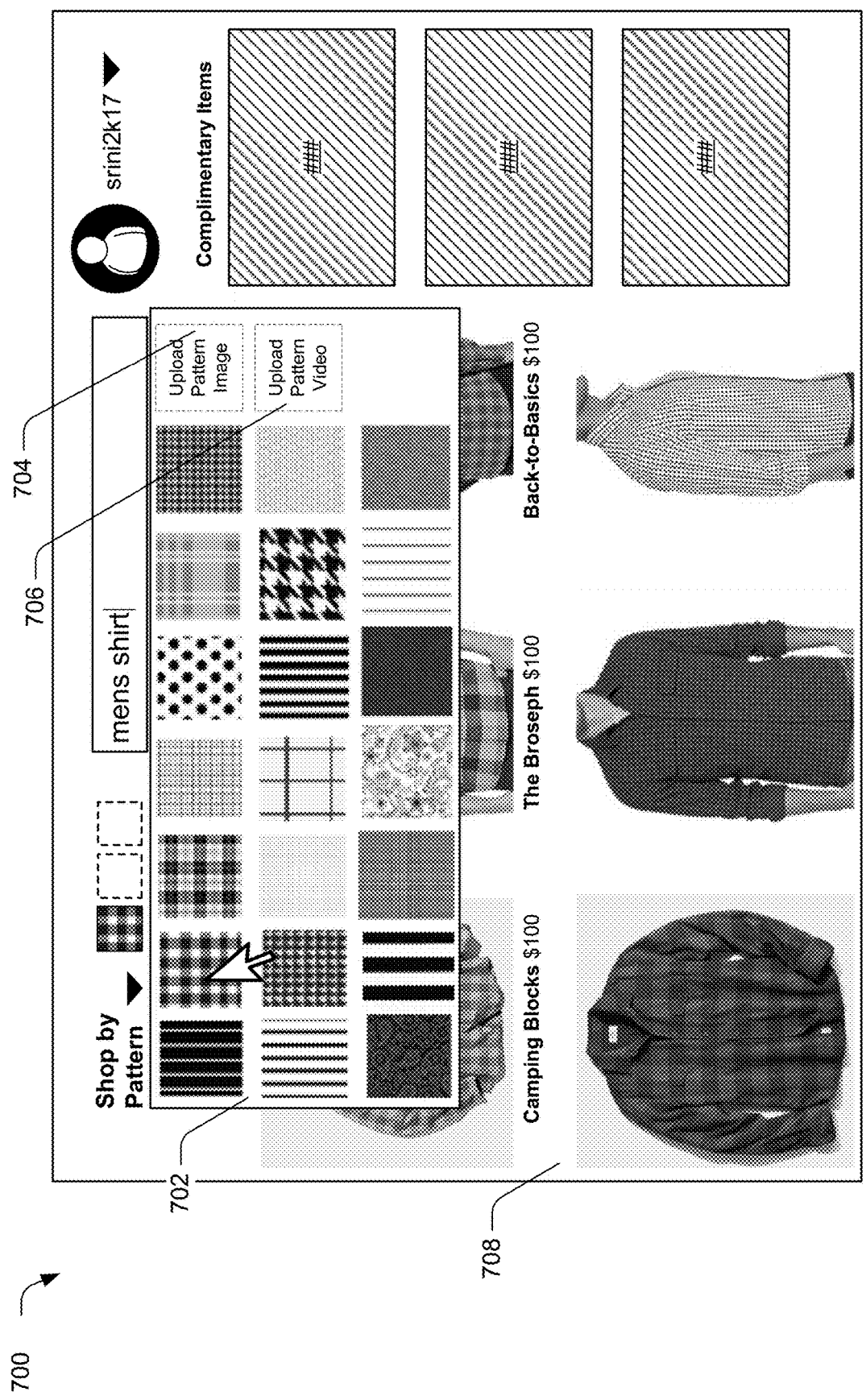
FIG. 7 depicts an example user interface having images of a plurality of different patterns that are presented to enable visual searches to be performed of visual listing data.

FIG. 6 depicts another example environment 600 that is operable to employ aspects of listings with patterns, textures, and materials. It is to be appreciated that the components of the illustrated environment 600 may correspond to the components and systems discussed in relation to the other figures described herein without departing from the spirit or scope of the techniques.

The illustrated example 600 includes the computing device 102, another computing device 602, and the service provider system 104, which are communicatively coupled via the network 106. The computing device 102 and the other computing device 602 are each illustrated with a communication module 610, 612 which represent functionality to enable this communication. In the illustrated example 600, the computing device 102 is depicted providing listing data 614 having visual listing data 616 to the service provider system 104. In this example, the computing device 102 may be associated with a client device user that is listing an item via the service provider system 104, e.g., listing the item for sale via the service provider system. Further, the visual listing data 616 may correspond to one or more images or videos of the item listed via the listing data.

In this example, the service provider system 104 is illustrated with a listing system 618 having a computer vision module 620 and a pattern recognition module 622. The computer vision module 620 represents functionality of the listing system 618 to process the visual listing data 616 (images and/or videos) of the received listing data 614, e.g., to generate different data (feature vectors) to describe visual characteristics of the listed item. The computer vision module 620 also represents functionality to perform a variety of other computer vision techniques with respect to visual content of items listed via a listing service and also to perform visual searches for items listed via the service. After processing received visual listing data 616, the listing system 618 may cause this visual information to be stored as part of the listing data 624 at the service provider system 104. This stored visual-specific information is illustrated in storage 124 as visual characteristic listing data 628. The listing data 624 is shown with ellipses to indicate that there may be a variety of the visual characteristic listing data 628 for a particular item being listed and also that the listing data 624 may include the visual characteristic listing data 628 for multiple different items. To this extent, the pattern recognition module 622 may represent functionality of the listing system 618 to detect patterns, textures, and/or materials of items that are depicted in visual content. The pattern recognition module 622 also represents functionality to generate information indicative of detected patterns, textures, and/or materials, e.g., image feature vectors.

The other computing device 602 is depicted communicating query data 630 that includes visual query data 632 to the service provider system 104. The visual query data 632 may correspond to one or more images and/or videos selected for upload by a client device user of the other computing device 602, one or more images and/or videos selected by the client device user via a user interface of the service provider system 104, or one or more images generated by the other computing device 602 based on user-provided input received to draw a pattern. Broadly speaking, the client device user of the other computing device 602 may have provided the query data 630 to search the listings of the service provider system 104, e.g. to search the listings to purchase an item listed. In any case, the computer vision module 620 may leverage the visual query data 632 to perform a visual search of the visual characteristic listing data 628 to identify listings that match the search query, such as listed items having patterns, textures, and/or materials that are visually similar or the same as patterns, textures, and/or materials depicted in the visual query data 632. The listing system 618 can then generate query response data 634 for communication back to the other computing device 602. In general, this query response data 634 is indicative of the identified listings. The query response data 634 may correspond to a list of the listings (or a subset of them) that are a match with the visual query data 632. The query response data 634 enables the other computing device 602 to present digital content of corresponding items for purchase via a user interface, e.g., a listing of the items including images of them. In the context of user interfaces to search for listed items, consider FIG. 7, which depicts an example of a user interface 700.

The example user interface 700 includes multiple user interface instrumentalities 702 that have images of different patterns. These instrumentalities are selectable to generate a search query for listings that are visually similar or the same as the selected pattern. The user interface 700 also includes an instrumentality 704 that enables a user to upload an image of a pattern to be used as a basis for a search and another instrumentality 706 that enables a user to upload a video of a pattern to be used as a basis for a search. The user interface 700 can be presented to a searching user to enable visual searches to be performed of the visual characteristic listing data 628. In operation, a client device user may select one of these instrumentalities with the pattern images, which can then serve as a query image to perform the visual search.

Figure 8:
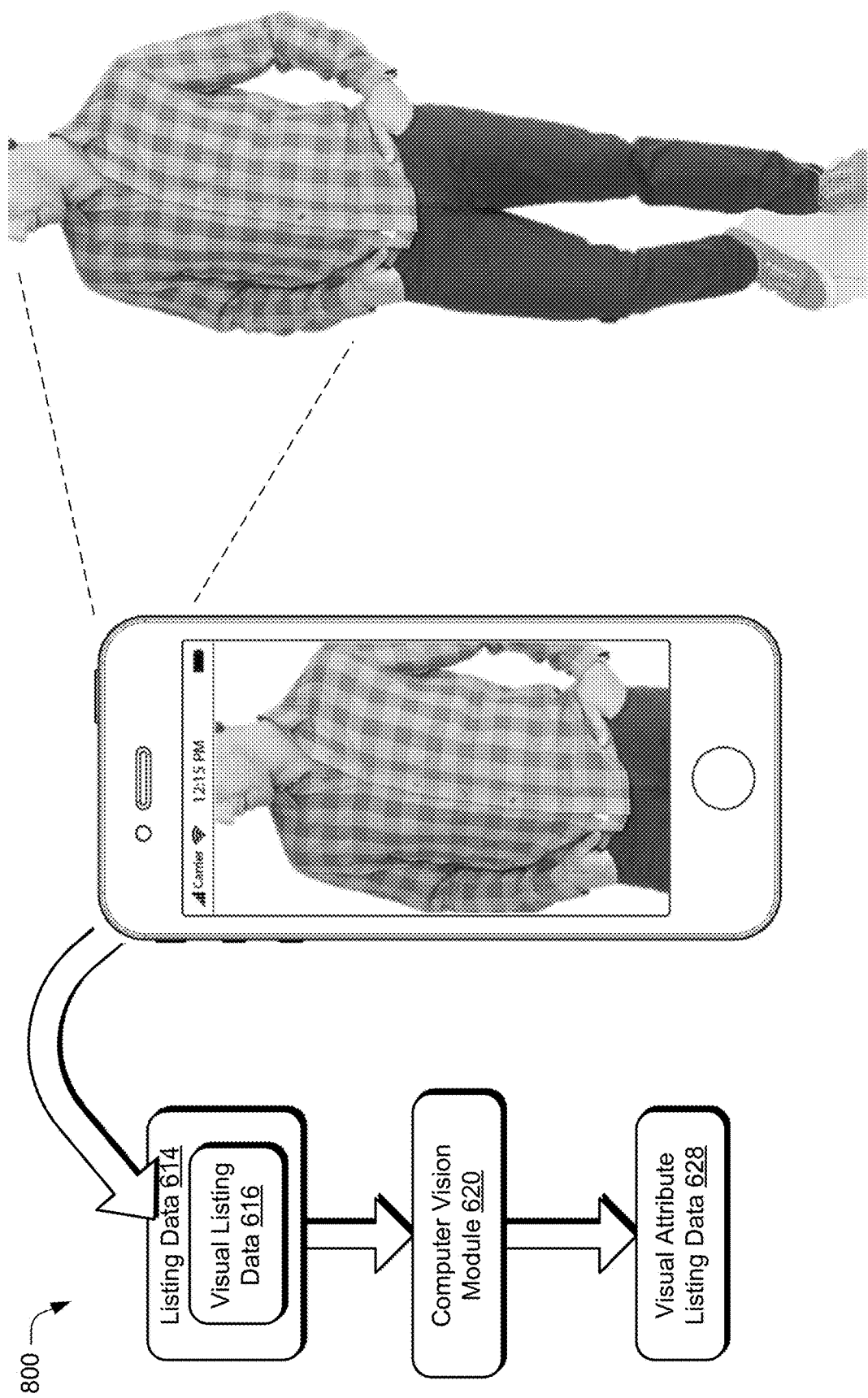
FIG. 8 depicts an example scenario in which an image is captured of an item that is to be listed.

FIG. 8 illustrates an example scenario 800 in which an image is captured of an item that is to be listed. In this scenario, the image is captured using a mobile device (which corresponds to the computing device 102). The captured image then serves as the visual listing data 616, which may be processed by the listing system 618 to describe visual characteristics of depicted items.

Figure 9:
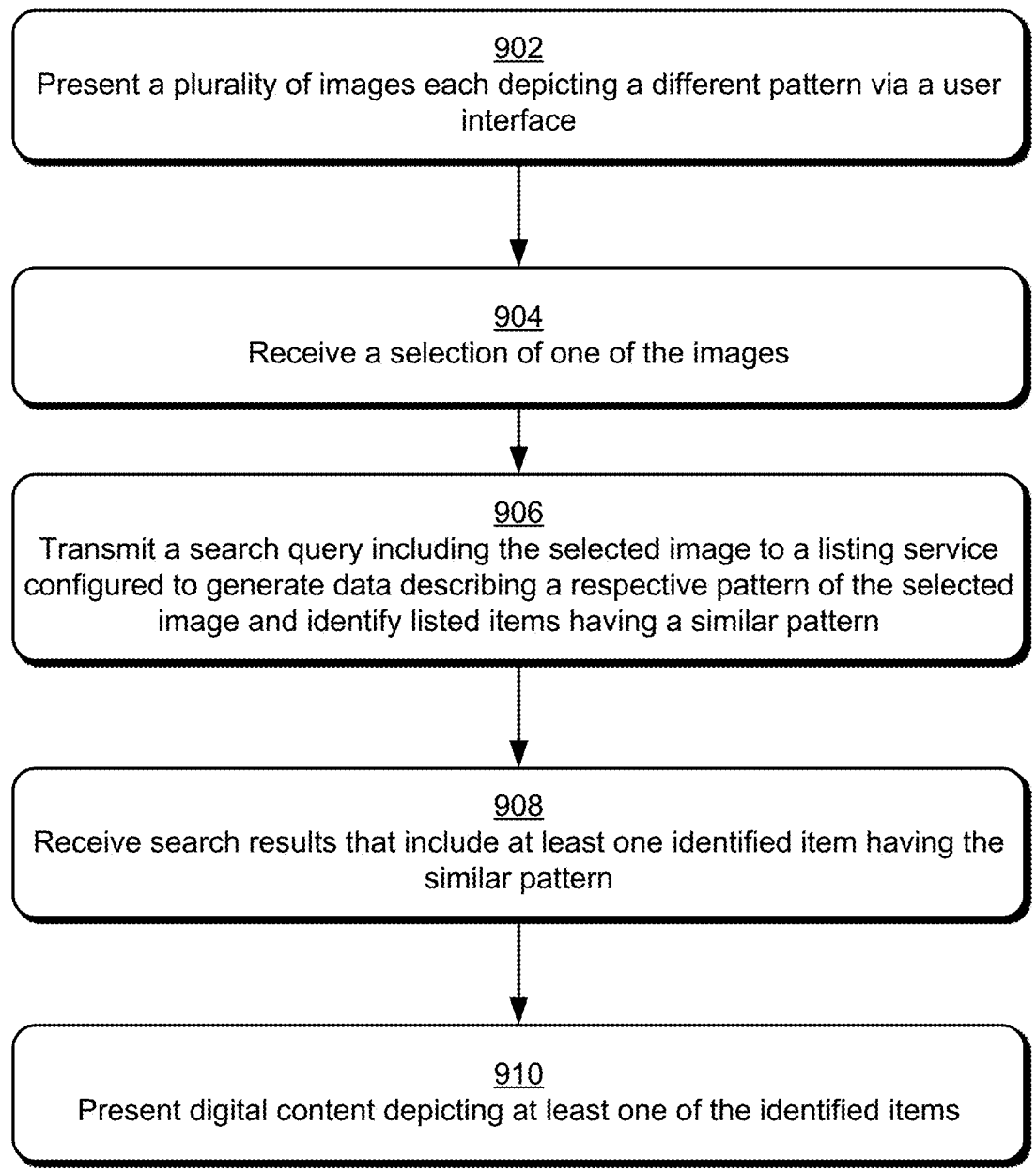
FIG. 9 depicts a procedure in an example implementation in which a user interface having a plurality of selectable images of patterns is used to conduct a visual search for images.

FIG. 9 depicts a procedure 900 in an example implementation in which a user interface having a plurality of selectable images of patterns is used to conduct a visual search for images.

A plurality of images each depicting a different pattern is presented via a user interface (block 902). By way of example, the other computing device 602 displays the user interface 700 which includes the multiple user interface instrumentalities 702 that have images of different patterns and are selectable to generate a search query for listings that are visually similar or the same as a selected pattern. A selection of one of the images is received (block 904). By way of example, the other computing device 602 receives a selection of one of the multiple user interface instrumentalities 702, such as a touch selection, a voice-based selection, a stylus selection, a mouse selection, and so forth.

A search query including the selected image is transmitted to a listing service (block 906). In accordance with the principles discussed herein, the listing service is configured to generate data describing a respective pattern of the selected image and identify listed items having a similar pattern. By way of example, the other computing device 602 configures the image selected at block 904 as the visual query data 632 and packages it as part of the query data 630. The communication module 612 then communicates the query data 630 over the network to the service provider system 104. In this scenario, the service provider system 104 leverages the functionality of the listing system (e.g., the computer vision module 620 and the pattern recognition module 622) to generate data describing a respective pattern of the visual query data 632 and identify listings in the listing data 624 having a similar pattern, e.g., through a comparison with the visual characteristic listing data 628.

Search results that include at least one identified item having a similar pattern are received (block 908). By way of example, the other computing device 602 receives the query response data 634, which includes at least one item having a similar pattern as identified by the listing system 618. Digital content depicting at least one of the identified items is presented via the user interface (block 910). By way of example, the user interface 700 presents images 708, which in this example represent items identified by the listing system 618.

In one or more implementations, the service provider system 104 also generates analytics based on the visual query data 632, such as analytics indicative of the patterns, textures, and materials for which users search. The service provider system 104 can then provide this information to entities that list and/or produce products. Consider an example in which client device users perform a multitude of searches for a similar plaid pattern during the winter. The service provider system 104 may generate analytics indicating that users are searching for this plaid, and that only a few search results are returned to the client device users, because there are very few available products listed having this or a same pattern. A listing client device user may utilize this information to list more products having this pattern. An entity that produces products may utilize this information to produce more products having this pattern.

The described system also supports the advantage of describing patterns, textures, and materials using data that results from visual processing techniques rather than rely on human-understandable text descriptions. This can result in more accurate descriptions of patterns, textures, and materials of an item that is being listed than the human-understandable text descriptions. This also enables the system to easily identify listed items having characteristics that visually match, or are visually similar, to queried for patterns, textures, and materials. Consider now the following discussion of using computer vision and image characteristic search for pattern-based authentication.

Pattern-Based Authentication

Conventional systems for enabling client device users to list products and services for surfacing to other client device users generally provide the listing users control over how listed products and services are described in corresponding listings. Typically, the only mechanisms of these conventionally-configured systems to ensure that listing users are listing what they say they are listing are reviews of other client device users that have followed through with the listing, e.g., by purchasing, renting, and so on, the listed product or service. At that point, however, the client device users have already committed some amount of resources (e.g., time, money, and so forth) to following through with the listed item. These systems do not prevent at least a few users from following through with listed products or services that fail to meet the provided description. One example of this scenario is listing users listing counterfeit products (e.g., handbags, sunglasses, watches, and so forth) as being authentic. Client device users that do not trust surfaced descriptions of listed products and services may simply not use a platform that lists products or services with untrustworthy descriptions.

To overcome these problems, computer vision and image characteristic search is used for pattern-based authentication in a digital medium environment. The pattern-based authentication system obtains visual content (e.g., one or more images or videos) of a product or service that is to be listed and confirms or denies a designation of authenticity. To confirm or deny an authentic designation, the pattern-based authentication system compares determined visual characteristics of the product or service depicted in obtained visual content to characteristics in visual content of a product or service known to be authentic. The pattern-based authentication system may use image or video processing techniques along with visual pattern matching to determine whether a captured pattern matches a known authentic pattern.

By way of example, authentic handbags of a particular brand may have stitching that is indicative of authenticity. The pattern-based authentication system may thus require listing client device users, that are listing such a handbag as authentic, to also provide an image or video of the stitching. The pattern-based authentication system can then use image processing techniques to compare the stitching pattern of the provided image to a known authentic stitching pattern depicted in an image. If the pattern-based authentication system determines that the stitching pattern of the provided image matches the known authentic stitching pattern, the pattern-based authentication system allows a listing user to list the handbag as authentic. In contrast, for watches the pattern-based authentication system may require listing users to upload video showing how a watch's second hand rotates around the face. The pattern-based authentication system may determine authenticity based on comparison of the movement in the provided video to video of a second hand of a known authentic watch.

Figure 10:
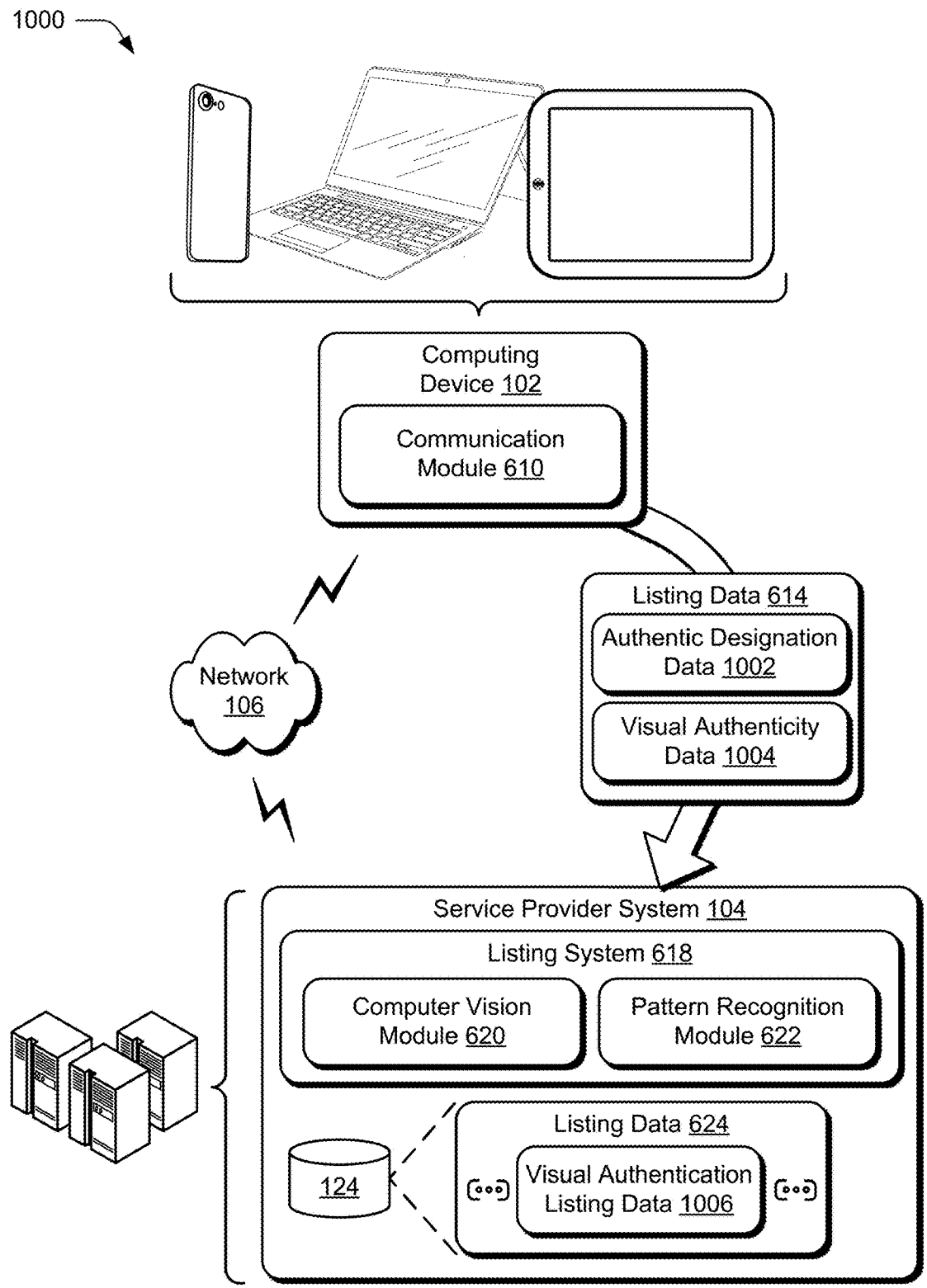
FIG. 10 depicts another example environment that is operable to employ aspects of pattern-based authentication as described herein.

FIG. 10 depicts another example environment 1000 that is operable to employ aspects of pattern-based authentication. For instance, the pattern-based authentication system may be implemented as part of the service provider system 104 or accessible to the service provider system 104 to provide the described functionality. It is to be appreciated that the components of the illustrated environment 1000 may correspond to the components and systems discussed in relation to the other figures described herein without departing from the spirit or scope of the techniques.

The illustrated environment 1000 includes the computing device 102 and the service provider system 104, which may be configured as described above. In the illustrated example 1000, the listing data 614 includes authentic designation data 1002 and visual authenticity data 1004. In accordance with the described techniques, the authentic designation data 1002 corresponds to a user selection indicating that the listed product or service is "authentic," e.g., the listed item is an authentic branded handbag or an authentic branded watch. Based on such a selection, the computing device 102 may prompt the user to also provide visual content for confirming authenticity of the product or service being listed. Absent confirmation of authenticity from visual content, the pattern-based authentication system may not allow the listing to include an authentic designation.

In any case, the visual authenticity data 1004 represents one or more images or videos provided by the listing user for confirming the authenticity of the listed product or service. The listing system 618 may employ the computer vision module 620 and the pattern recognition module 622 to determine from the visual authenticity data 1004 whether the product being listed is authentic, e.g., by comparing one or more patterns captured in the visual authenticity data 1004 to known authentic patterns. The pattern-based authentication system allows the listing user to list the product or service as authentic or not depending on the determination.

The illustrated visual authentication listing data 1006 indicates whether products or services being listed correspond to authentic products and services or not. This data can serve as the basis for allowing the listing user to list a product or service as authentic or not. In accordance with the described techniques, consider FIG. 11.

Figure 11:
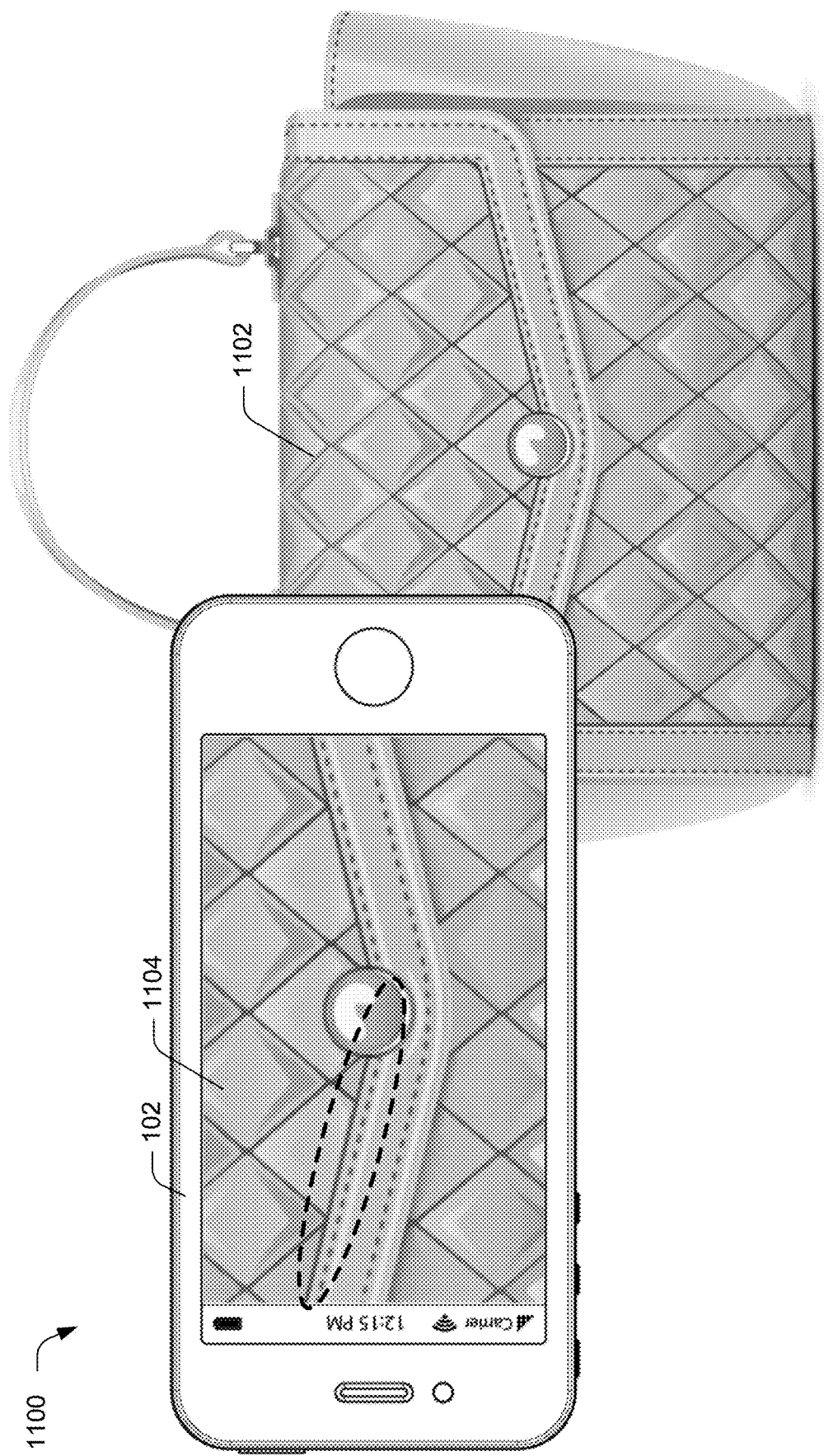
FIG. 11 depicts an example scenario in which a client device user uses a mobile device to capture visual content of an item that is selected to be listed as authentic.

FIG. 11 depicts an example scenario 1100 in which a client device user uses the computing device 102 (depicted in this example as a mobile device) to capture visual content of an item the user has selected to list as authentic. In the illustrated scenario 1100, the product that the user is listing is handbag 1102. Prior to the illustrated portion of the scenario 1100, the pattern-based authentication system may have prompted the client device user to capture an image or video of a portion of the handbag 1102 near its closure mechanism and including stitching of the handbag. In this example 1100, the computing device 102 is depicting having captured or capturing visual content corresponding to this portion, a preview of which is shown displayed on display screen 1104 of the computing device 102. The computing device 102 packages the captured visual content with the listing data 614 as the visual authenticity data 1004. The service provider system 104 can then use this data to determine authenticity of the handbag 1102. It is to be appreciated that authenticity of a variety of products and services may be determined in accordance with the described techniques.

Figure 12:
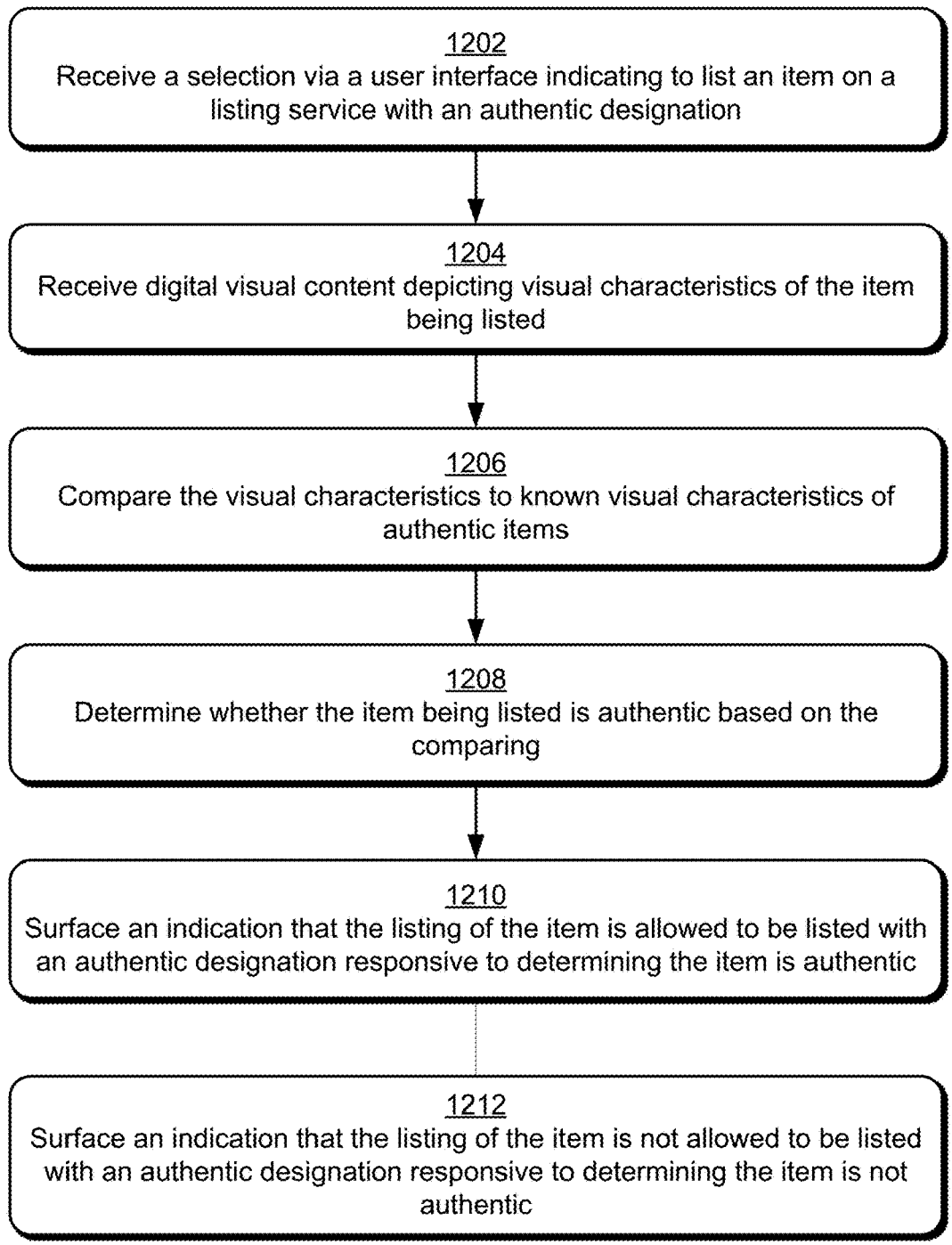
FIG. 12 depicts a procedure in an example implementation in which an item to be listed with a listing service is determined authentic or not based on known visual characteristics of authenticity.

FIG. 12 depicts a procedure 1200 in an example implementation in which an item to be listed with a listing service is determined authentic or not based on known visual characteristics of authenticity.

A selection is received via a user interface indicating to list an item on a listing service with an authentic designation (block 1202). By way of example, the computing device 102 receives a selection made via a user interface to list the handbag 1102 on a listing service associated with the service provider system 104 and with an authentic designation. As noted above, the selection to list an item as authentic may be described by the authentic designation data 1002. Accordingly, the service provider system 104 receives data describing that a user has selected to list the handbag 1102 with an authentic designation.

Digital visual content depicting visual characteristics of the item being listed is received (block 1204). By way of example, a user deploys functionality of the computing device 102 to capture an image of the handbag 1102, such as the image displayed via the display screen 1104 in FIG. 11. The computing device 102 packages this captured image as the visual authenticity data 1004. The service provider system 104 thus receives the image of the handbag 1102 as part of the listing data 614.

The visual characteristics are compared to known visual characteristics of authentic items (block 1206). By way of example, the listing system 618 leverages functionality to compare the visual characteristics depicted in the image of the handbag 1102 to known visual characteristics of authentic handbags, as described by visual authentication listing data 1006. A determination is made as to whether the item being listed is authentic or not based on the comparing (block 1208). By way of example, the listing system 618 makes a determination as to whether the handbag 1102 is authentic or not based on the comparing of block 1206.

An indication that the item is allowed to be listed with an authentic designation is surfaced responsive to a determination that the item is authentic (block 1210). By way of example, the listing system 618 determines at block 1208 that the handbag 1102 is authentic based on the comparing of block 1206. Responsive to this, the service provider system 104 surfaces an indication (e.g., by communicating it to the computing device 102) that the handbag 1102 is allowed to be listed with an authentic designation.

An indication that the item is not allowed to be listed with an authentic designation is surfaced responsive to a determination that the item is not authentic (block 1212). By way of example, the listing system 618 determines at block 1208 that the handbag 1102 is not authentic based on the comparing of block 1206. Responsive to this, the service provider system 104 surfaces an indication (e.g., by communicating it to the computing device 102) that the handbag 1102 is not allowed to be listed with the authentic designation.

Having described example techniques and procedures in accordance with one or more implementations, consider now an example system and device that can be utilized to implement the various techniques described herein.

Example System and Device

Figure 13:
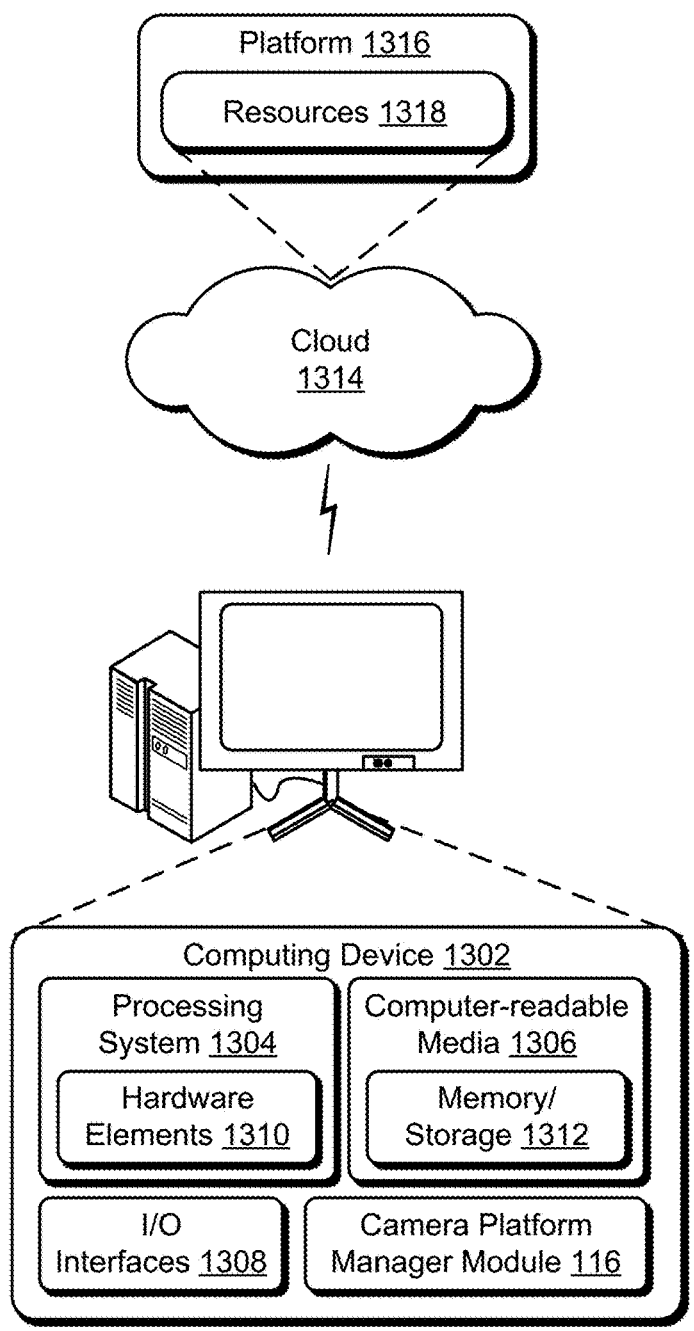
FIG. 13 illustrates an example system including various components of an example device that can be implemented as any type of computing device as described and/or utilized with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the camera platform manager module 116. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

Conclusion

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by at least one computing device, the method comprising:
    displaying, by the at least one computing device, a prompt via a user interface providing authentication instructions for providing digital visual content depicting one or more visual characteristics of an item being listed on a listing service, the authentication instructions instructing a user to provide the digital visual content of a specified portion of the item being listed depicting movement of the item being listed;
    receiving, by the at least one computing device, user selection of the digital visual content from a live feed of digital visual content via the user interface that depicts the one or more visual characteristics of the item being listed on the listing service;
    generating, by the at least one computing device, non-textual data indicative of the one or more visual characteristics of the item from the digital visual content, wherein the non-textual data is at least one feature vector;
    comparing, by the at least one computing device, the non-textual data to additional non-textual data indicative of visual characteristics of known authentic items generated from additional digital visual content depicting the known authentic items;
    determining, by the at least one computing device, whether the item being listed is authentic based on the comparing; and
    responsive to a determination that the item being listed is authentic, surfacing, by the at least one computing device, an indication that a listing of the item on the listing service is allowed to include an authentic designation; or
    responsive to a determination that the item being listed is not authentic, surfacing, by the at least one computing device, an indication that the listing of the item on the listing service is not allowed to include the authentic designation.

2. The method as described in claim 1, wherein the authentication instructions specify a location of the item being listed to capture in the digital visual content.

3. The method as described in claim 1, wherein the authentication instructions specify a feature of the item being listed to capture in the digital visual content.

4. The method as described in claim 1, further comprising receiving an additional selection to surface the listing of the item with the authentic designation via the listing service.

5. The method as described in claim 1, wherein the digital visual content depicting the one or more characteristics of the item being listed comprises digital video.

6. The method as described in claim 1, wherein the digital visual content depicting the one or more characteristics of the item being listed comprises at least one digital image.

7. The method as described in claim 1, wherein the additional non-textual data is at least one feature vector.

8. A system comprising:
    one or more processors; and
    memory having stored thereon computer-readable instructions that are executable by the one or more processors to perform operations comprising:
        displaying a prompt via a user interface providing authentication instructions for providing digital visual content depicting one or more visual characteristics of an item being listed on a listing service, the authentication instructions instructing a user to provide the digital visual content of a specified portion of the item being listed depicting movement of the item being listed on the listing service;
        receiving user selection of the digital visual content from a live feed of digital visual content via the user interface that depicts the one or more visual characteristics of the item being listed on the listing service;
        generating non-textual data indicative of the one or more visual characteristics of the item from the digital visual content, wherein the non-textual data is at least one feature vector;
        comparing the non-textual data to additional non-textual data indicative of visual characteristics of known authentic items generated from additional digital visual content depicting the known authentic items;
        determining whether the item being listed is authentic based on the comparing; and
        controlling presentation of an authentic designation with a listing of the item according to the determining.

9. The system as described in claim 8, wherein the additional non-textual data is at least one feature vector.

10. The system as described in claim 8, wherein controlling the presentation of the authentic designation with the listing includes allowing the item to be listed via the listing service with the authentic designation responsive to a determination that the item is authentic.

11. The system as described in claim 8, wherein controlling the presentation of the authentic designation with the listing includes preventing the item from being listed via the listing service with the authentic designation responsive to a determination that the item is not authentic.

12. The system as described in claim 8, wherein the listing service prevents items from being listed with the authentic designation absent a determination that the items are authentic.

13. The system as described in claim 8, wherein the operations further comprise receiving a selection via the user interface to list the item on the listing service with the authentic designation.

14. The system as described in claim 8, further comprising receiving an additional selection to surface the listing of the item with the authentic designation via the listing service.

15. A method implemented by at least one computing device, the method comprising:
    displaying a prompt via a user interface providing authentication instructions for providing digital visual content depicting one or more visual characteristics of an item being listed on a listing service;
    receiving user selection of the digital visual content from a live feed of digital visual content via the user interface that depicts the one or more visual characteristics of the item being listed on the listing service, the authentication instructions instructing a user to provide the digital visual content of a specified portion of the item being listed depicting movement of the item being listed;

generating non-textual data indicative of the one or more visual characteristics of the item from the digital visual content, wherein the non-textual data includes at least one feature vector;

comparing the non-textual data to additional non-textual data indicative of visual characteristics of known authentic items generated from additional digital visual content depicting the known authentic items;

determining whether the item being listed is authentic based on the comparing; and controlling presentation of an authentic designation with a listing of the item according to the determining.

16. The method as described in claim 15, wherein the additional non-textual data includes at least one feature vector.

17. The method as described in claim 15, wherein the listing service prevents items from being listed with the authentic designation absent a determination that the items are authentic.

18. The method as described in claim 15, wherein the authentication instructions instruct the user to capture digital video of the item being listed.

19. The method as described in claim 15, wherein the authentication instructions instruct the user to capture at least one digital image of the item being listed.

20. The method as described in claim 15, wherein the authentication instructions specify at least one of:
   a location of the item being listed to capture in the digital visual content; or
   a feature of the item being listed to capture in the digital visual content.

* * * * *